United States Patent
Song et al.

(10) Patent No.: US 10,809,421 B2
(45) Date of Patent: Oct. 20, 2020

(54) STACKED TRANSPARENT FILM AND WINDOW FOR DISPLAY DEVICE AND DISPLAY DEVICE

(71) Applicants: SAMSUNG ELECTRONICS CO., LTD., Suwon-si, Gyeonggi-do (KR); Samsung SDI Co., Ltd., Yongin-si, Gyeonggi-do (KR)

(72) Inventors: Sun Jin Song, Seoul (KR); Sang Soo Jee, Hwaseong-si (KR); Boreum Jeong, Daejeon (KR); Hyunjeong Jeon, Seoul (KR); Chanjae Ahn, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 162 days.

(21) Appl. No.: 15/714,436

(22) Filed: Sep. 25, 2017

(65) Prior Publication Data

US 2018/0112049 A1 Apr. 26, 2018

(30) Foreign Application Priority Data

Oct. 21, 2016 (KR) .................. 10-2016-0137546

(51) Int. Cl.
*G02B 1/14* (2015.01)
*C08G 73/14* (2006.01)
(Continued)

(52) U.S. Cl.
CPC .............. *G02B 1/14* (2015.01); *C08G 69/265* (2013.01); *C08G 69/32* (2013.01); *C08G 69/40* (2013.01);
(Continued)

(58) Field of Classification Search
CPC ............ C08G 73/14; G02B 1/00–1/18; G02B 5/00–5/32; B32B 27/00–27/42; B32B 7/00–7/14; C09D 183/04
See application file for complete search history.

(56) References Cited

U.S. PATENT DOCUMENTS 3,658,773 A * 4/1972 Zecher ............... C08G 18/2855
528/48
3,716,519 A * 2/1973 Yoda .................. C08G 18/3821
528/73
(Continued)

FOREIGN PATENT DOCUMENTS

EP 1275681 A1 1/2003
EP 1564237 A1 8/2005
(Continued)

OTHER PUBLICATIONS

Lee et al. "Mechanical properties of thiol-ene UV-curable thermoplastic polysilsesquioxanes". Polymer, 68, (2015); pp. 140-146.*
(Continued)

*Primary Examiner* — Prashant J Khatri
(74) *Attorney, Agent, or Firm* — Cantor Colburn LLP

(57) ABSTRACT

A stacked transparent film includes a polymer film including at least one of an amide structural unit and an imide structural unit, wherein the polymer film has a refractive index of about 1.65 to about 1.75 at a 550 nanometer wavelength and an elastic modulus of greater than or equal to about 5.5 gigapascals; and at least one of a first coating layer on a first side of the polymer film and a second coating layer on a side opposite the first side of the polymer film.

23 Claims, 2 Drawing Sheets

(51) Int. Cl.

| | | |
|---|---|---|
| C08G 69/32 | (2006.01) | |
| C08G 73/10 | (2006.01) | |
| C08G 69/42 | (2006.01) | |
| C08G 69/26 | (2006.01) | |
| C08G 69/40 | (2006.01) | |
| C09D 179/08 | (2006.01) | |
| C08J 5/18 | (2006.01) | |
| C08J 7/04 | (2020.01) | |
| G02B 1/04 | (2006.01) | |
| G02F 1/1333 | (2006.01) | |
| G02B 5/20 | (2006.01) | |

(52) U.S. Cl.
CPC ........... *C08G 69/42* (2013.01); *C08G 73/105* (2013.01); *C08G 73/1039* (2013.01); *C08G 73/1042* (2013.01); *C08G 73/1067* (2013.01); *C08G 73/1071* (2013.01); *C08G 73/14* (2013.01); *C08J 5/18* (2013.01); *C08J 7/042* (2013.01); *C09D 179/08* (2013.01); *G02B 1/04* (2013.01); *C08J 2379/08* (2013.01); *C08J 2483/04* (2013.01); *C08J 2483/06* (2013.01); *G02B 5/208* (2013.01); *G02F 2001/133331* (2013.01); *G02F 2201/50* (2013.01)

(56) References Cited

U.S. PATENT DOCUMENTS

| 6,207,728 | B1* | 3/2001 | Sekiguchi | ............... | C09D 4/00 |
| | | | | | 522/113 |
| 7,671,141 | B2 | 3/2010 | Hsu et al. | | |
| 2013/0004700 | A1* | 1/2013 | Jo | ............... | B32B 27/08 |
| | | | | | 428/77 |
| 2013/0130002 | A1* | 5/2013 | Lee | ............... | G02F 1/1333 |
| | | | | | 428/216 |
| 2014/0072813 | A1* | 3/2014 | Fujii | ............... | C08G 73/14 |
| | | | | | 428/435 |
| 2014/0243482 | A1* | 8/2014 | Park | ............... | C08G 73/14 |
| | | | | | 525/450 |
| 2014/0356602 | A1* | 12/2014 | Oh | ............... | B32B 27/08 |
| | | | | | 428/216 |
| 2015/0057426 | A1 | 2/2015 | Cho et al. | | |

FOREIGN PATENT DOCUMENTS

| EP | 3040366 A1 | 7/2016 |
| EP | 3156436 A1 | 4/2017 |
| EP | 3162837 A1 | 5/2017 |
| JP | 2005146162 A | 6/2005 |
| JP | 2006051668 A | 2/2006 |
| KR | 101208437 B1 | 11/2012 |
| KR | 1020160002402 A | 1/2016 |
| KR | 101602686 B1 | 3/2016 |

OTHER PUBLICATIONS

Wood, R.W. "The Invisibility of Transparent Objects". Phys. Rev. (Series I), 15, (1902); pp. 123-124.*

Extended European Search Report dated Jul. 30, 2018, of the corresponding European Patent Application No. 17192189.3.

Partial European Search Report dated Mar. 18, 2018, of the corresponding European Patent Application No. 17192189.3.

* cited by examiner

STACKED TRANSPARENT FILM AND WINDOW FOR DISPLAY DEVICE AND DISPLAY DEVICE

CROSS-REFERENCE TO RELATED APPLICATION

This application claims priority to and the benefit of Korean Patent Application No. 10-2016-0137546 filed in the Korean Intellectual Property Office on Oct. 21, 2016, and all the benefits accruing therefrom under 35 U.S.C. § 119, the entire content of which is incorporated herein in its entirety by reference.

BACKGROUND

1. Field

A stacked transparent film, a window for a display device, and a display device are disclosed.

2. Description of the Related Art

Portable electronic devices that are manufactured as a smart phone, a tablet PC, and the like, can benefit from having a display device that is flexible. For instance, it is desirable for the display device to be bendable, foldable, or rollable, as well as being slim and light.

Currently, a display device that is mounted on portable electronic devices uses a rigid glass screen to protect a display module. However, a glass screen may lack flexibility and thus may not be suitable for application to a flexible display device. Accordingly, there remains a need to develop a transparent film made of a polymer that can be used as an alternative to the glass.

SUMMARY

An embodiment provides a stacked transparent film capable of improving optical properties and mechanical characteristics while having flexibility.

Another embodiment provides a window for a display device including the stacked transparent film.

Yet another embodiment provides a display device including the stacked transparent film.

According to an embodiment, a stacked transparent film includes a polymer film including at least one of an amide structural unit and an imide structural unit, wherein the polymer film has a refractive index of about 1.65 to about 1.75 at a 550 nanometer wavelength and an elastic modulus of greater than or equal to about 5.5 gigapascals; and at least one of a first coating layer on a first side of the polymer film and a second coating layer on a side opposite the first side of the polymer film.

A light transmittance of the stacked transparent film in a visible ray region may be greater than light transmittance of the polymer film in a visible ray region.

A pencil hardness of the stacked transparent film may be greater than a pencil hardness of the polymer film, each as measured according to ASTM D3363.

The pencil hardness of the polymer film may be greater than or equal to 2H and the pencil hardness of the stacked transparent film may be greater than or equal to 4H, each as measured according to ASTM D3363.

An absolute value of a yellow index of the stacked transparent film may be less than an absolute value of a yellow index of the polymer film, each as measured according to ASTM D1925.

The absolute value of the yellow index of the polymer film may be less than or equal to about 4.0 and the absolute value of the yellow index of the stacked transparent film may be less than or equal to about 2.0, each as measured according to ASTM D1925.

The first coating layer may have a refractive index of about 1.45 to about 1.55 at a 550 nanometer wavelength.

The first coating layer may include a polysiloxane copolymer having a cross-linked structure.

The first coating layer may further include inorganic particles dispersed in the polysiloxane copolymer or chemically bound to the polysiloxane copolymer.

The first coating layer may further include a light absorbing material that absorbs light in at least a portion of an about 570 nanometer to about 780 nanometer wavelength region.

The second coating layer may include a light absorbing material that absorbs light in at least a portion of an about 570 nanometer to about 780 nanometer wavelength region.

The second coating layer may have a refractive index of about 1.50 to about 1.65.

The stacked transparent film may include the second coating layer and may further include a transparent adhesive layer on a side of the second coating layer opposite the polymer film.

The transparent adhesive layer may have a refractive index of about 1.45 to about 1.55.

The stacked transparent film may have a light transmittance of greater than or equal to about 85%, a pencil hardness of greater than or equal to 4H, as measured according to ASTM D3363, and an absolute value of a yellow index of less than or equal to about 1.5, as measured according to ASTM D1925, simultaneously.

The polymer film may have a thickness of about 20 micrometers to about 100 micrometers.

The polymer film may be an amide-imide copolymer film including the amide structural unit and the imide structural unit.

According to another embodiment, an amide-imide copolymer film has a thickness of about 20 micrometers to about 100 micrometers, a refractive index of about 1.65 to about 1.75 at a 550 nanometer wavelength, and an elastic modulus of greater than or equal to about 5.5 gigapascals.

A pencil hardness of the amide-imide copolymer film may be greater than or equal to 2H, as measured according to ASTM D3363.

An absolute value of a yellow index of the amide-imide copolymer film may be less than or equal to about 4.0, as measured according to ASTM D1925.

According to another embodiment, a window for a display device is provided, and the window includes the stacked transparent film or the amide-imide copolymer film.

According to yet another embodiment, a display device includes the stacked transparent film or the amide-imide copolymer film.

The stacked transparent film has improved optical properties and mechanical characteristics while having flexibility, and thus may be effectively applied to a flexible display device.

DETAILED DESCRIPTION

Figure 1:
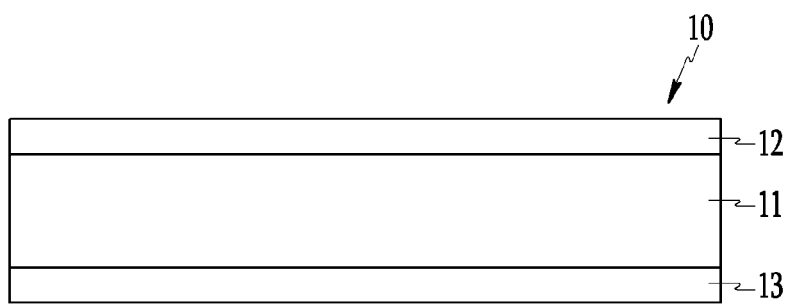
FIG. 1 is a cross-sectional view of a stacked transparent film according to an embodiment.

Exemplary embodiments will hereinafter be described in detail with reference to the accompanying drawings, in which various embodiments are shown. However, this disclosure may be embodied in many different forms and is not to be construed as limited to the exemplary embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "under," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when a definition is not otherwise provided, the term 'substituted' refers to replacement of at least one hydrogen of a compound by a halogen atom (F, Cl, Br, or I), a hydroxy group, an alkoxy group, a nitro group, a cyano group, an amino group, an azido group, an amidino group, a hydrazino group, a hydrazono group, a carbonyl group, a carbamoyl group, a thiol group, an ester group, a carboxylic acid group or a salt thereof, a sulfonic acid group or a salt thereof, phosphoric acid group or a salt thereof, a C1 to C20 alkyl group, a C1 to C20 haloalkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof.

As used herein, when a definition is not otherwise provided, the term "hetero" refers to a compound or group including 1 to 4 heteroatoms selected from N, O, S, Se, Te, Si, and P.

As used herein, when a definition is not otherwise provided, the term "alkyl" group refers to a straight or branched chain saturated aliphatic hydrocarbon having the specified number of carbon atoms, and having a valence of at least one, optionally substituted with one or more substituents where indicated, provided that the valence of the alkyl group is not exceeded.

As used herein, when a definition is not otherwise provided, the term "aliphatic group" means a saturated or unsaturated linear or branched hydrocarbon group. An aliphatic group may be an alkyl, alkenyl, or alkynyl group, for example.

As used herein, when a definition is not otherwise provided, the term "alicyclic group" means a cyclic hydrocarbon having properties of an aliphatic group. The alicyclic group may be a C5 to C30 cycloalkyl group, a C5 to C30 cycloalkenyl group, or a C5 to C30 cycloalkynyl group.

As used herein, when a definition is not otherwise provided, the term "alkenyl" group refers to a straight or branched chain hydrocarbon that comprises at least one carbon-carbon double bond, having the specified number of carbon atoms, and having a valence of at least one, optionally substituted with one or more substituents where indicated, provided that the valence of the alkenyl group is not exceeded.

As used herein, when a definition is not otherwise provided, the term "alkynyl" group refers to a straight or branched chain, monovalent hydrocarbon group having at least one carbon-carbon triple bond, having the specified number of carbon atoms, and having a valence of at least one, optionally substituted with one or more substituents where indicated, provided that the valence of the alkynyl group is not exceeded.

As used herein, when a definition is not otherwise provided, the alkyl group, the alkenyl group, or the alkynyl group may be linear or branched. Examples of the alkyl group may be a methyl group, an ethyl group, an iso-propyl group, a tert-butyl group, a n-octyl group, a n-decyl group, a n-hexadecyl group, and the like. Examples of the alkenyl group may be a vinyl group, an allyl group, a 2-butenyl group, or 3-pentenyl group. Examples of the alkynyl group may be a propargyl group, or a 3-pentynyl group.

As used herein, when a definition is not otherwise provided, the term "cycloalkyl" group refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the alkyl group is not exceeded.

As used herein, when a definition is not otherwise provided, the term "aryl" group refers to a cyclic group in which all ring members are carbon and at least one ring is aromatic, the group having the specified number of carbon atoms, for example a C6 to C30 aryl group, and specifically a C6 to C18 aryl group, and having a valence of at least one, optionally substituted with one or more substituents where indicated, provided that the valence of the aryl group is not exceeded. More than one ring may be present, and any additional rings may be independently aromatic, saturated or partially unsaturated, and may be fused, pendant, spirocyclic, or a combination thereof.

As used herein, when a definition is not otherwise provided, the term "heteroaryl" means a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. The heteroatom(s) are generally independently selected from nitrogen (N), oxygen (O), phosphorus (P), and sulfur (S).

As used herein, when a definition is not otherwise provided, the term "aromatic group" includes an aryl group, a heteroaryl group, or a combination thereof.

As used herein, when a definition is not otherwise provided, the term "amino group" refers to —NRR' wherein R and R' are independently hydrogen, a C1 to C20 alkyl group, or a C6 to C30 aryl group.

As used herein, when a definition is not otherwise provided, the term "siloxane" refers to a compound or polymer containing a divalent radical of the formula —[Si(R)(R')O]— wherein R and R' are independently hydrogen, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C3 to C30 heteroaryl group, a substituted or unsubstituted C2 to C30 alkenyl group, a substituted or unsubstituted C1 to C30 alkoxy group, or a hydroxy group.

As used herein, when a definition is not otherwise provided, the term "silyl" refers to a monovalent radical of the formula (R)(R')(R")Si— wherein R, R', and R" are each independently hydrogen, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C3 to C30 heteroaryl group, a substituted or unsubstituted C2 to C30 alkenyl group, a substituted or unsubstituted C1 to C30 alkoxy group, or a hydroxy group.

As used herein, the term "(meth)acryl" includes any group containing the moiety $H_2C=CHRC(=O)$— wherein R is hydrogen ("acryl" herein) or methyl ("methacryl" herein). "(Meth)acryl" includes the corresponding acids or salts thereof (referred to herein as "(meth)acrylic"), esters (referred to herein as "($C_1$-$C_{20}$ alkyl) (meth)acrylate"), and amides (referred to herein as "(meth)acrylamide").

Herein, "(meth)acryl polymer" or "(meth)acryl resin" includes any polymer derived from polymerization of an acryl or a methacryl monomer, e.g., acrylonitrile, methacrylonitrile, acrylamide, methacrylamide, acrylic acid, methacrylic acid, or an ester of acrylic or methacrylic acid.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C20 alkyl" refers to a C1 to C20 alkyl group substituted with a C6 to C20 aryl group, the total number of carbon atoms in the resulting aryl substituted alkyl group is C7 to C40.

As used herein, the term 'combination' refers to a mixture of two or more and/or a laminate of two or more.

Hereinafter, the term 'imide' refers to an imide by itself and refers to an imide and an amic acid that is a precursor of the imide.

Hereinafter, a stacked transparent film according to an embodiment is described.

FIG. 1 is a cross-sectional view of a stacked transparent film according to an embodiment.

Referring to FIG. 1, a stacked transparent film 10 according to an embodiment includes a polymer film 11, a first coating layer 12 on a first side of the polymer film 11, and a second coating layer 13 under the polymer film 11, that is, the second coating layer is on a side of the polymer film opposite the first coating layer.

The polymer film 11 is a base substrate for the stacked transparent film 10 and may be a polymerization film or copolymerization film obtained by polymerizing at least one monomer and/or oligomer.

For example, the polymer film 11 may include at least one of an amide structural unit and an imide structural unit, and may include, for example an amide polymer film including an amide structural unit, an imide polymer film including an imide structural unit, or an amide-imide copolymer film including an amide structural unit and an imide structural unit.

For example, the polymer film 11 may be an amide-imide copolymer film.

For example, the polymer film 11 may be an amide-imide copolymer film including a structural unit represented by Chemical Formula 1 and a structural unit represented by Chemical Formula 2.

Chemical Formula 1

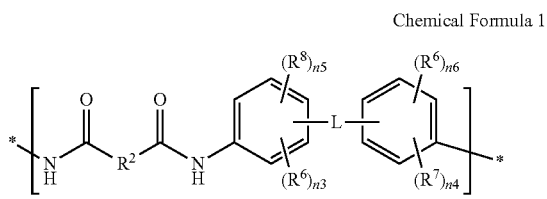

In Chemical Formula 1,

L is a single bond, —CONH—, -Ph-CONH-Ph-, or —NHCO-Ph-CONH—, wherein Ph is a substituted or unsubstituted phenylene, $R^2$ is a divalent organic group including one or two or more substituted or unsubstituted C6 to C30 aromatic rings, wherein two or more aromatic rings may be bound to each other to form a fused ring or two or more aromatic rings may be linked to each other through a single bond, O, S, $S(=O)_2$, C=O, C(=O)NH, $CR^a(OH)$, $SiR^bR^c$, or $(CR^dR^e)_p$ (wherein, $1 \leq p \leq 10$) wherein $R^a$ to $R^e$ are independently hydrogen or a substituted or unsubstituted C1 to C30 alkyl group, $R^6$ and $R^7$ are independently an electron withdrawing group, for example —$CF_3$, —$CCl_3$, —$CBr_3$, —$Cl_3$, —$NO_2$, —CN, —$COCH_3$, or —$CO_2O_2H_5$, $R^8$ and $R^9$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocycloalkyl group, a halogen, a hydroxy group, or a substituted or unsubstituted silyl group, n3 is an integer of 0 to 4, n5 is an integer of 0 to 3, and n3+n5 is an integer of 0 to 4, and n4 is an integer of 0 to 4, n6 is an integer of 0 to 3, and n4+n6 is an integer of 0 to 4.

Chemical Formula 2

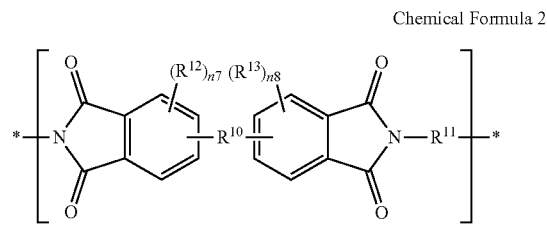

In Chemical Formula 2, $R^{16}$ is the same or different in each repeating unit and is independently a single bond, a substituted or unsubstituted C1 to C30 aliphatic group, a substituted or unsubstituted C3 to C30 alicyclic group, a substituted or unsubstituted C6 to C30 aromatic group, a substituted or unsubstituted C2 to C30 heterocycloalkyl group, or a combination thereof, $R^{11}$ is the same or different in each repeating unit and independently includes a substituted or unsubstituted C6 to C30 aromatic group, wherein the aromatic group is monocyclic; the aromatic group includes two or more aromatic rings that are fused to each other to provide a fused cyclic group; or the aromatic group includes two or more aromatic groups are linked through a single bond, a substituted or unsubstituted fluorenyl group, O, S, C(=O), CH(OH), $S(=O)_2$, $Si(CH_3)_2$, $(CH_2)_p$ (wherein, $1 \leq p \leq 10$), $(CF_2)_q$ (wherein, $1 \leq q \leq 10$), $C(CH_3)_2$, $C(CF_3)_2$, or C(=O)NH, $R^{12}$ and $R^{13}$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocycloalkyl group, a halogen, a hydroxy group, or a substituted or unsubstituted silyl group, and n7 and n8 are independently an integer of 0 to 3.

For example, the structural unit represented by Chemical Formula 1 may be a structural unit represented by Chemical Formula 1a, a structural unit represented by Chemical Formula 1b, or a combination thereof, but is not limited thereto.

Chemical Formula 1a

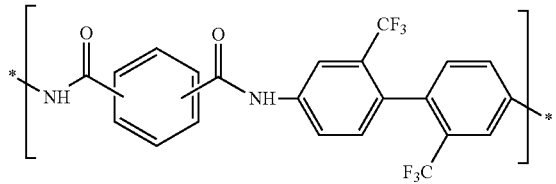

Chemical Formula 1b

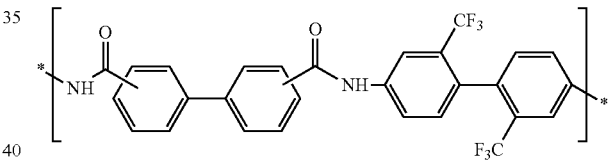

For example, the structural unit represented by Chemical Formula 2 may include a structural unit represented by Chemical Formula 2a, a structural unit represented by Chemical Formula 2b, or a combination thereof, but is not limited thereto.

Chemical Formula 2a

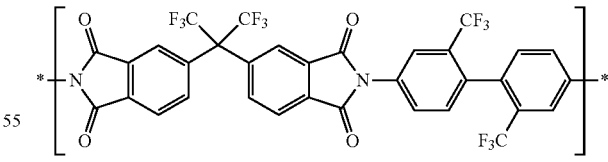

Chemical Formula 2b

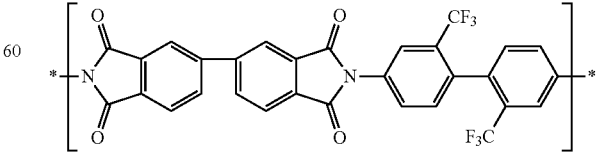

For example, the amide-imide copolymer film may include the structural unit represented by Chemical Formula 1 and the structural unit represented by Chemical Formula 2 in a molar ratio of about 90:10 to about 10:90. Within the ranges, for example, the structural unit represented by Chemical Formula 1 and the structural unit represented by Chemical Formula 2 may be included in a molar ratio of about 90:10 to about 30:70. Within the ranges, for example, the structural unit represented by Chemical Formula 1 and the structural unit represented by Chemical Formula 2 may be included in a molar ratio of about 90:10 to about 50:50. For example, the structural unit represented by Chemical Formula 1 may be included in a greater amount than the structural unit represented by Chemical Formula 2.

The amide-imide copolymer film may be, for example, obtained by reacting an anhydride, a diamine compound, and dicarboxylic acid derivative. For example, the amide-imide copolymer film may be obtained by reacting tetracarboxylic acid dianhydride represented by Chemical Formula 3, a diamine compound represented by Chemical Formula 4, and dicarboxylic acid derivative represented by Chemical Formula 5.

Chemical Formula 3

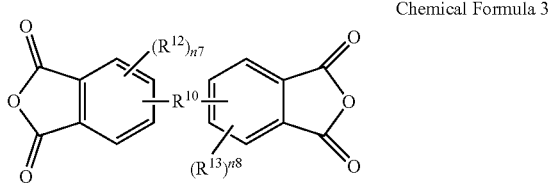

Chemical Formula 4

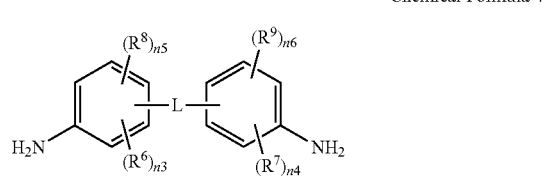

Chemical Formula 5

$$X^1-CO-R^2-CO-X^2 \quad \text{Chemical Formula 5}$$

In Chemical Formulae 3 to 5, L, $R^2$, $R^6$ to $R^{10}$, $R^{12}$, $R^{13}$, and n3 to n8 are the same as described above, and $X^1$ and $X^2$ are independently a halogen atom.

For example, the tetracarboxylic acid dianhydride represented by Chemical Formula 3 may be, for example, 3,3',4,4'-biphenyltetracarboxylic acid dianhydride (BPDA), 4,4'-(hexafluoroisopropylidene)diphthalic anhydride (6FDA) or a combination thereof, the diamine compound represented by Chemical Formula 4 may be, for example, 2,2'-bis(trifluoromethyl)benzidine (TFDB), and the dicarboxylic acid derivative represented by Chemical Formula may be, for example, 4,4'-biphenyldicarbonylchloride (BPCL), terephthaloylchloride (TPCL), or a combination thereof.

For example, the amide-imide copolymer film may be obtained by providing about 0.1 moles (mol) to about 0.7 mol of the tetracarboxylic acid dianhydride and about 0.3 mol to about 0.9 mol of the dicarboxylic acid derivative relative to 1 mol of the diamine monomer.

For example, the amide-imide copolymer film may be obtained by forming an amide structural unit through a reaction of a dicarboxylic acid derivative with a diamine compound; adding a tetracarboxylic acid dianhydride thereto to react them, link the amide structural unit with the amic acid structural unit, and thus obtain an amide-amic acid copolymer; casting the amide-amic acid copolymer on a substrate to form a film; and heat-treating the film to obtain an amide-imide copolymer film.

For example, the amide-imide copolymer film may be obtained by preparing an oligomer (hereinafter, referred to as the 'amide group-containing oligomer') including an amide group and amino groups at both terminal ends through a reaction of a dicarboxylic acid derivative and a diamine compound; reacting the amide group-containing oligomer as a diamine compound with a tetracarboxylic acid dianhydride to obtain an amide-imide copolymer.

The polymer film 11 may have a refractive index of about 1.65 to about 1.75 at a 550 nanometer (nm) wavelength (hereinafter, referred to as 'a reference wavelength'). When the polymer film 11 has a refractive index within this range, the described first coating layer 12 and/or second coating layer 13 are combined to improve optical properties of the stacked transparent film 10. As used herein, "at a 550 nanometer wavelength" means that the refractive index is measured and reported at 550 nm.

The polymer film 11 may have a light transmittance of greater than or equal to about 80% in a visible ray region of about 380 nm to about 780 nm, for example, within the range, a light transmittance of greater than or equal to about 85%.

The polymer film 11 may have a birefringence of less than or equal to about 0.001, for example, within the range, a birefringence of less than or equal to about 0.0009, for example, of less than or equal to about 0.0008.

The polymer film 11 may have a yellow index (YI, ASTM D1925) of less than or equal to about 4.0 (absolute value). Within the range, the polymer film 11 may have a yellow index of less than or equal to about 3.5 (absolute value). Herein, the absolute value of the yellow index is a yellow index that is measured according to ASTM D1925.

The polymer film 11 may have an elastic modulus of greater than or equal to about 5.5 gigapascals (GPa). The elastic modulus may be realized by increasing a polymer inter-chain packing of the amide polymer, the imide polymer, or the amide-imide copolymer including the amide structural unit and/or the imide structural unit. The polymer film 11 may have, for example an elastic modulus of about 5.5 GPa to about 10.0 GPa, an elastic modulus of about 5.5 GPa to about 9.0 GPa, an elastic modulus of about 5.5 GPa to 8.0 GPa, or an elastic modulus of about 5.5 GPa to about 7.0 GPa. The polymer film 11 may improve mechanical characteristics of the stacked transparent film 10 when the elastic modulus is within the ranges.

The polymer film 11 may have pencil hardness of greater than or equal to about 2H. Herein the pencil hardness is a pencil hardness that is measured according to ASTM D3363.

The polymer film 11 may have a thickness of about 20 micrometers (μm) to about 100 μm. Within the range, the polymer film 11 may have a thickness of about 20 μm to 95 μm, a thickness of about 30 μm to 100 μm, or a thickness of about 30 μm to 95 μm.

Each of the first coating layer 12 and the second coating layer 13 are disposed on and under the polymer film 11, i.e., on opposite sides of the polymer film. Each of the first coating layer 12 and the second coating layer 13 may have one layer or two or more layers, and either of the first coating layer 12 and the second coating layer 13 may be omitted as needed.

The first coating layer 12 on the polymer film 11 may protect the stacked transparent film 10 from mechanical and physical damage. The first coating layer 12 may be, for example, a hard coating layer, a scratch resistance layer, or a high hardness layer.

The first coating layer 12 may include, for example, an organic material, an inorganic material, an organic/inorganic material, or a combination thereof having high hardness characteristics. The first coating layer 12 may include, for example, an organic material such as an acrylic resin, an epoxy resin, a silicone resin, an oxetane resin, or a combination thereof; an inorganic material such as silica, alumina, or zirconia; an organic/inorganic hybrid material such as a siloxane copolymer and a polysilsesquioxane; or a combination thereof.

For example, the first coating layer 12 may include a siloxane copolymer having a cross-linked structure. The first coating layer 12 may be, for example, obtained by curing a siloxane copolymer having a cross-linkable functional group, and a network structure through cross-linking bonds between the cross-linkable functional groups during curing is formed, and thus good mechanical properties may be realized. Herein, the cross-linkable functional group is a functional group capable of a cross-linking reaction by heat and/or light, and may include, for example a (meth)acrylate group, an epoxy group, a glycidyl group, a glycidoxy group, oxetanyl group, an oxetanyloxy group, or a combination thereof, but is not limited thereto.

The siloxane copolymer having a cross-linkable functional group may be, for example, represented by Chemical Formula 6.

$$(R^{20}SiO_{3/2})_x(R^{21}R^{22}SiO_{2/2})_y \qquad \text{Chemical Formula 6}$$

In Chemical Formula 6, $R^{20}$ to $R^{22}$ are independently hydrogen, a substituted or unsubstituted C1 to C20 alkyl group, a substituted or unsubstituted C3 to C20 cycloalkyl group, a substituted or unsubstituted C6 to C30 aryl group, a cross-linkable functional group, or a group including a cross-linkable functional group, at least one of $R^{20}$ to $R^{22}$ is a cross-linkable functional group or a group including a cross-linkable functional group, $0<x<1$, $0<y<1$, and $x+y=1$.

The cross-linkable functional group is a functional group capable of a cross-linking reaction by heat and/or light, and may include, for example a (meth)acrylate group, an epoxy group, a glycidyl group, a glycidoxy group, an oxetanyl group, an oxetanyloxy group, or a combination thereof, but is not limited thereto.

The siloxane copolymer represented by Chemical Formula 6 may increase the mechanical strength of the first coating layer 12 due to the cross-linking bond and simultaneously provide flexibility to the first coating layer 12.

For example, $R^{20}$ of Chemical Formula 6 may be a cross-linkable functional group or a group including a cross-linkable functional group. For example, $R^{20}$ of Chemical Formula 6 may be (3,4-epoxycyclohexyl)methyl, (3,4-epoxycyclohexyl)ethyl, (3,4-epoxycyclohexyl)propyl, 3-glycidoxypropyl, 3-oxetanylmethyl, 3-oxetanylethyl, 3-oxetanylpropyl, or 3-oxetanyloxy.

For example, at least one of $R^{2'}$ and $R^{22}$ of Chemical Formula 6 may be a substituted or unsubstituted C1 to C20 alkyl group. For example, one of $R^{21}$ and $R^{22}$ of Chemical Formula 6 may be a substituted or unsubstituted C1 to C20 alkyl group and the other may be a cross-linkable functional group or a group including a cross-linkable functional group. For example, one of $R^{21}$ and $R^{22}$ of Chemical Formula 6 may be a substituted or unsubstituted C1 to C20 alkyl group, respectively. For example, one of $R^{21}$ and $R^{22}$ of Chemical Formula 6 may independently be methyl, ethyl, propyl, (3,4-epoxycyclohexyl)methyl, (3,4-epoxycyclohexyl)ethyl, (3,4-epoxycyclohexyl)propyl, or glycidoxypropyl.

The siloxane copolymer represented by Chemical Formula 6 may be represented by one of Chemical Formulae 6-1 to 6-9, but is not limited thereto:

| | |
|---|---|
| $(EcSiO_{3/2})_x(EcMeSiO_{2/2})_y$ | Chemical Formula 6-1 |
| $(EcSiO_{3/2})_x((Me)_2SiO_{2/2})_y$ | Chemical Formula 6-2 |
| $(EcSiO_{3/2})_x(GpMeSiO_{2/2})_y$ | Chemical Formula 6-3 |
| $(GpSiO_{3/2})_x(EcMeSiO_{2/2})_y$ | Chemical Formula 6-4 |
| $(GpSiO_{3/2})_x((Me)_2SiO_{2/2})_y$ | Chemical Formula 6-5 |
| $(GpSiO_{3/2})_x(GpMeSiO_{2/2})_y$ | Chemical Formula 6-6 |
| $(OpSiO_{3/2})_x(EcMeSiO_{2/2})_y$ | Chemical Formula 6-7 |
| $(OpSiO_{3/2})_x((Me)_2SiO_{2/2})_y$ | Chemical Formula 6-8 |
| $(OpSiO_{3/2})_x(GpMeSiO_{2/2})_y$ | Chemical Formula 6-9 |

In Chemical Formulae 6-1 to 6-9, Ec is a (3,4-epoxycyclohexyl)ethyl group, Me is a methyl group, Gp is a 3-glycidoxypropyl group, Op is a 3-oxetanylpropyl group, $0<x<1$, $0<y<1$, and $x+y=1$.

The siloxane copolymer having the cross-linkable functional group may be, for example, represented by Chemical Formula 7.

$$(R^{23}SiO_{3/2})_w(R^{24}SiO_{3/2})_z \qquad \text{Chemical Formula 7}$$

In Chemical Formula 7, $R^{23}$ is a cross-linkable functional group or a group including a cross-linkable functional group, $R^{24}$ is an ultraviolet (UV) absorbing functional group or a group including an ultraviolet (UV) absorbing functional group, $0<W<1$, $0<z<1$, and $w+z=1$. The cross-linkable functional group is a functional group capable of a cross-linking reaction by heat and/or light, and may include, for example a (meth)acrylate group, an epoxy group, a glycidyl group, a glycidoxy group, oxetanyl group, an oxetanyloxy group, or a combination thereof, but is not limited thereto.

The ultraviolet (UV) absorbing functional group is a functional group capable of absorbing light in at least a portion of a wavelength region of less than or equal to about 400 nm, for example, about 100 nm to about 400 nm, and may be, for example, a substituted or unsubstituted benzotriazolyl, a substituted or unsubstituted benzophenonyl, a substituted or unsubstituted hydroxybenzophenonyl, a substituted or unsubstituted triazinyl, a substituted or unsubstituted salicylate, a substituted or unsubstituted cyanoacrylate, a substituted or unsubstituted oxanilide, a substituted or unsubstituted hydroxyphenyltriazinyl, a substituted or unsubstituted hydroxyphenylbenzotriazolyl, a substituted or unsubstituted hydroxyphenylbenzophenonyl, or a combination thereof, but is not limited thereto.

The siloxane copolymer represented by Chemical Formula 7 may increase the mechanical strength due to the cross-linking bond, simultaneously provide flexibility, and additionally increase the optical reliability.

The siloxane copolymer represented by Chemical Formula 7 includes an ultraviolet (UV) absorbing functional group or a group including an ultraviolet (UV) absorbing functional group as well as the cross-linkable functional group or the group including a cross-linkable functional group, and thereby a ratio of a structural unit represented by $(R^{23}SiO_{3/2})$ and a structural unit represented by $(R^{24}siO_{3/2})$ is appropriately controlled based on the desired hardness and optical reliability of the stacked transparent film 10. For example, in Chemical Formula 7, $0.20 \leq w \leq 0.999$ and $0.001 \leq z \leq 0.80$ may be satisfied, for example, $0.20 \leq w \leq 0.99$ and $0.01 \leq z \leq 0.80$ may be satisfied, or, for example, $0.80 \leq w \leq 0.99$ and $0.01 \leq z \leq 0.20$ may be satisfied. Within the ranges, the stacked transparent film 10 may have an improved surface hardness, flexibility, and optical reliability.

The siloxane copolymer represented by Chemical Formula 7 may be represented by one of Chemical Formulae 7-1 to 7-12, but is not limited thereto:

| | |
|---|---|
| $(EcSiO_{3/2})_w(R^kSiO_{3/2})_z$ | Chemical Formula 7-1 |
| $(EcSiO_{3/2})_w(R^lSiO_{3/2})_z$ | Chemical Formula 7-2 |
| $(EcSiO_{3/2})_w(R^mSiO_{3/2})_z$ | Chemical Formula 7-3 |
| $(EcSiO_{3/2})_w(R^nSiO_{3/2})_z$ | Chemical Formula 7-4 |
| $(GpSiO_{3/2})_w(R^kSiO_{3/2})_z$ | Chemical Formula 7-5 |
| $(GpSiO_{3/2})_w(R^lSiO_{3/2})_z$ | Chemical Formula 7-6 |
| $(GpSiO_{3/2})_w(R^mSiO_{3/2})_z$ | Chemical Formula 7-7 |
| $(GpSiO_{3/2})_w(R^nSiO_{3/2})_z$ | Chemical Formula 7-8 |
| $(OpSiO_{3/2})_w(R^kSiO_{3/2})_z$ | Chemical Formula 7-9 |
| $(OpSiO_{3/2})_w(R^lSiO_{3/2})_z$ | Chemical Formula 7-10 |
| $(OpSiO_{3/2})_w(R^mSiO_{3/2})_z$ | Chemical Formula 7-11 |
| $(OpSiO_{3/2})_w(R^nSiO_{3/2})_z$ | Chemical Formula 7-12 |

In Chemical Formulae 7-1 to 7-12,

Ec is a (3,4-epoxycyclohexyl)ethyl group, Gp is a 3-glycidoxypropyl group, and Op is a 3-oxetanylpropyl group, $R^k$ is a group represented by Chemical Formula i,
$R^l$ is a group represented by Chemical Formula ii,
$R^m$ is a group represented by Chemical Formula iii,
$R^n$ is a group represented by Chemical Formula iv, and
$0<w<1$, $0<z<1$, and $w+z=1$,

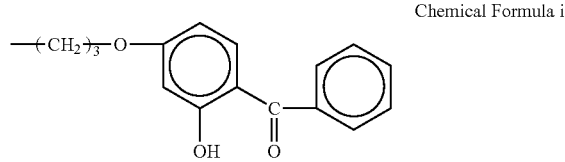

Chemical Formula i

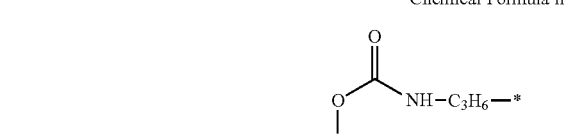

Chemical Formula ii

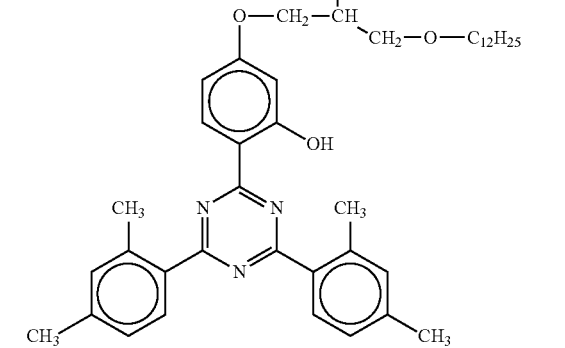

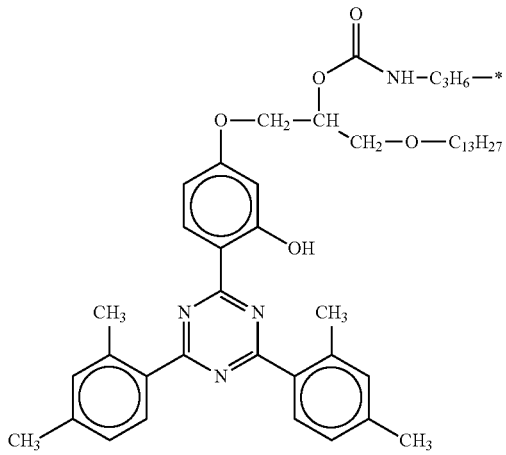

Chemical Formula iii

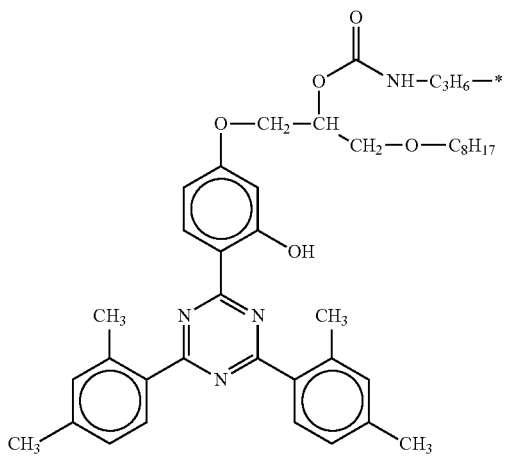

Chemical Formula iv wherein, in Chemical Formulae i to iv, * is a linking point.

The siloxane copolymer having the cross-linkable functional group may be, for example, represented by Chemical Formula 8.

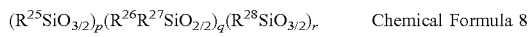

$(R^{25}SiO_{3/2})_p(R^{26}R^{27}SiO_{2/2})_q(R^{28}SiO_{3/2})_r$  Chemical Formula 8

In Chemical Formula 8, $R^{25}$ to $R^{27}$ are independently hydrogen, a substituted or unsubstituted C1 to C20 alkyl group, a substituted or unsubstituted C3 to C20 cycloalkyl group, a substituted or unsubstituted C6 to C30 aryl group, a cross-linkable functional group, or a group including a cross-linkable functional group, at least one of $R^{25}$ to $R^{27}$ is a cross-linkable functional group or a group including a cross-linkable functional group, $R^{28}$ is an ultraviolet (UV) absorbing functional group or a group including an ultraviolet (UV) absorbing functional group, $0<p<1$, $0<q<1$, $0<r<1$, and $p+q+r=1$.

The cross-linkable functional group is a functional group capable of a cross-linking reaction by heat and/or light and may include, for example a (meth)acrylate group, an epoxy group, a glycidyl group, a glycidoxy group, oxetanyl group, an oxetanyloxy group, or a combination thereof, but is not limited thereto.

For example, $R^{25}$ of Chemical Formula 8 may be a cross-linkable functional group or a group including a cross-linkable functional group. For example, $R^{25}$ of Chemical Formula 8 may be (3,4-epoxycyclohexyl)methyl, (3,4-epoxycyclohexyl)ethyl, (3,4-epoxycyclohexyl)propyl, 3-glycidoxypropyl, 3-oxetanylmethyl, 3-oxetanylethyl, 3-oxetanylpropyl, or 3-oxetanyloxy.

For example, at least one of $R^{26}$ and $R^{27}$ of Chemical Formula 8 may be a substituted or unsubstituted C1 to C20 alkyl group. For example, one of $R^{26}$ and $R^{27}$ of Chemical Formula 8 may be a substituted or unsubstituted C1 to C20 alkyl group and the other may be a cross-linkable functional group or a group including a cross-linkable functional group. For example, $R^{26}$ and $R^{27}$ in Chemical Formula 8 may respectively be a substituted or unsubstituted C1 to C20 alkyl group. For example, one of $R^{26}$ and $R^{27}$ of Chemical Formula 8 may independently be methyl, ethyl, propyl, (3,4-epoxycyclohexyl)methyl, (3,4-epoxycyclohexyl)ethyl, (3,4-epoxycyclohexyl)propyl, or glycidoxypropyl. The ultraviolet (UV) absorbing functional group for Formula 8 is an ultraviolet (UV) absorbing functional group as described for Formula 7, above. The (UV) absorbing functional group is capable of absorbing at least one part of light in a wavelength region of less than or equal to about 400 nm, for example about 100 nm to about 400 nm, and may be, for example a substituted or unsubstituted benzotriazolyl, a substituted or unsubstituted benzophenonyl, a substituted or unsubstituted hydroxybenzophenonyl, a substituted or unsubstituted triazinyl, a substituted or unsubstituted salicylate, a substituted or unsubstituted cyanoacrylate, a substituted or unsubstituted oxanilide, a substituted or unsubstituted hydroxyphenyltriazinyl, a substituted or unsubstituted hydroxyphenylbenzotriazolyl, a substituted or unsubstituted hydroxyphenylbenzophenonyl, or combination thereof, but is not limited thereto.

The siloxane copolymer represented by Chemical Formula 8 may be represented by one of Chemical Formulae 8-1 to 8-36, but is not limited thereto:

| | |
|---|---|
| $(EcSiO_{3/2})_p(EcMeSiO_{2/2})_q(R^kSiO_{3/2})_r$ | Chemical Formula 8-1 |
| $(EcSiO_{3/2})_p(EcMeSiO_{2/2})_q(R^lSiO_{3/2})_r$ | Chemical Formula 8-2 |
| $(EcSiO_{3/2})_p(EcMeSiO_{2/2})_q(R^mSiO_{3/2})_r$ | Chemical Formula 8-3 |
| $(EcSiO_{3/2})_p(EcMeSiO_{2/2})_q(R^nSiO_{3/2})_r$ | Chemical Formula 8-4 |
| $(EcSiO_{3/2})_p((Me)_2SiO_{2/2})_q(R^kSiO_{3/2})_r$ | Chemical Formula 8-5 |
| $(EcSiO_{3/2})_p((Me)_2SiO_{2/2})_q(R^lSiO_{3/2})_r$ | Chemical Formula 8-6 |
| $(EcSiO_{3/2})_p((Me)_2SiO_{2/2})_q(R^mSiO_{3/2})_r$ | Chemical Formula 8-7 |
| $(EcSiO_{3/2})_p((Me)_2SiO_{2/2})_q(RnSiO_{3/2})_r$ | Chemical Formula 8-8 |
| $(EcSiO_{3/2})_p(GpMeSiO_{2/2})_q(R^kSiO_{3/2})_r$ | Chemical Formula 8-9 |
| $(EcSiO_{3/2})_p(GpMeSiO_{2/2})q(R^lSiO_{3,2})_r$ | Chemical Formula 8-10 |
| $(EcSiO_{3/2})_p(GpMeSiO_{2/2})_q(R^mSiO_{3/2})_r$ | Chemical Formula 8-11 |
| $(EcSiO_{3/2})_p(GpMeSiO_{2/2})_q(R^nSiO_{3/2})_r$ | Chemical Formula 8-12 |
| $(GpSiO_{3/2})_p(EcMeSiO_{2/2})_q(R^kSiO_{3/2})_r$ | Chemical Formula 8-13 |
| $(GpSiO_{3/2})_p(EcMeSiO_{2/2})_q(R^lSiO_{3/2})_r$ | Chemical Formula 8-14 |
| $(GpSiO_{3/2})_p(EcMeSiO_{2/2})_q(R^mSiO_{3/2})_r$ | Chemical Formula 8-15 |
| $(GpSiO_{3/2})_p(EcMeSiO_{2/2})_q(R^nSiO_{3/2})_r$ | Chemical Formula 8-16 |
| $(GpSiO_{3/2})_p((Me)_2SiO_{2/2})_q(R^kSiO_{3/2})_r$ | Chemical Formula 8-17 |
| $(GpSiO_{3/2})_p((Me)_2SiO_{2/2})_q(R^lSiO_{3/2})_r$ | Chemical Formula 8-18 |
| $(GpSiO_{3/2})_p((Me)_2SiO_{2/2})_q(R^mSiO_{3/2})_r$ | Chemical Formula 8-19 |
| $(GpSiO_{3/2})_p((Me)_2SiO_{2/2})_q(R^nSiO_{3/2})_r$ | Chemical Formula 8-20 |
| $(GpSiO_{3/2})_p(GpMeSiO_{2/2})_q(R^kSiO_{3/2})_r$ | Chemical Formula 8-21 |
| $(GpSiO_{3/2})_p(GpMeSiO_{2/2})_q(R^lSiO_{3/2})_r$ | Chemical Formula 8-22 |
| $(GpSiO_{3/2})_p(GpMeSiO_{2/2})_q(R^mSiO_{3/2})_r$ | Chemical Formula 8-23 |
| $(GpSiO_{3/2})_p(GpMeSiO_{2/2})_q(R^nSiO_{3/2})_r$ | Chemical Formula 8-24 |
| $(OpSiO_{3/2})_p(EcMeSiO_{2/2})_q(R^kSiO_{3/2})_r$ | Chemical Formula 8-25 |
| $(OpSiO_{3/2})_p(EcMeSiO_{2/2})_q(R^lSiO_{3/2})_r$ | Chemical Formula 8-26 |
| $(OpSiO_{3/2})_p(EcMeSiO_{2/2})_q(R^mSiO_{3/2})_r$ | Chemical Formula 8-27 |
| $(OpSiO_{3/2})_p(EcMeSiO_{2/2})_q(RnSiO_{3/2})_r$ | Chemical Formula 8-28 |
| $(OpSiO_{3/2})_p((Me)_2SiO_{2/2})_q(R^kSiO_{3/2})_r$ | Chemical Formula 8-29 |
| $(OpSiO_{3/2})_p((Me)_2SiO_{2/2})_q(R^lSiO_{3/2})_r$ | Chemical Formula 8-30 |
| $(OpSiO_{3/2})_p((Me)_2SiO_{2/2})_q(R^mSiO_{3/2})_r$ | Chemical Formula 8-31 |
| $(OpSiO_{3/2})_p((Me)_2SiO_{2/2})_q(R^nSiO_{3/2})_r$ | Chemical Formula 8-32 |
| $(OpSiO_{3/2})_p(GpMeSiO_{2/2})_q(R^kSiO_{3/2})_r$ | Chemical Formula 8-33 |
| $(OpSiO_{3/2})_p(GpMeSiO_{2/2})_q(R^lSiO_{3/2})_r$ | Chemical Formula 8-34 |
| $(OpSiO_{3/2})_p(GpMeSiO_{2/2})_q(R^mSiO_{3/2})_r$ | Chemical Formula 8-35 |
| $(OpSiO_{3/2})_p(GpMeSiO_{2/2})_q(R^nSiO_{3/2})_r$ | Chemical Formula 8-36 |

In Chemical Formulae 8-1 to 8-36, Ec is a 3,4-epoxycyclohexylethyl group, Me is a methyl group, Gp is a 3-glycidoxypropyl group, and Op is a 3-oxetanylpropyl group, $R^k$ to $R^n$ are respectively the same as defined above, i.e., are respectively groups represented by Chemical Formulae i to iv, $0<p<1$, $0<q<1$, $0<r<1$, and $p+q+r=1$.

The siloxane copolymer may be prepared by a known method of hydrolysis and condensation polymerization reactions of silane compounds.

A weight average molecular weight of the siloxane copolymer may range from about 4,000 grams per mole (g/mol) to about 100,000 g/mol, for example about 4,500 g/mol to about 10,000 g/mol. Within the ranges, the siloxane copolymer may be prepared and hardness and flexibility may be further improved.

A polydispersity index (PDI) of the siloxane copolymer may range from about 1.0 to about 3.0, for example about 1.5 to about 2.5. Within the ranges, during formation of the first coating layer 12, the coating-process properties are good and coating properties may be further stabilized.

An epoxy equivalent of the siloxane copolymer may range from about 0.1 mol/100 g to about 1.0 mol/100 g, for example about 0.3 mol/100 g to about 0.7 mol/100 g. Within the ranges, properties of the stacked transparent film 10 may be further stabilized. As used herein, the "epoxy equivalent" is the equivalent number of epoxy groups included in 100 g of the siloxane copolymer.

During curing of the siloxane copolymer, an initiator may be used in order to cure the cross-linkable functional group. The initiator may be a photo-cation initiator and/or a photo-radical initiator. The initiator may be used alone or as a mixture of two or more initiators.

The photo-cation initiator may be, for example, an onium salt including a cation and an anion. For example, the cation may be a diaryliodonium such as diphenyliodonium, 4-methoxydiphenyliodonium, bis (4-methylphenyl)iodonium, bis (4-tert-butylphenyl)iodonium, bis(dodecylphenyl)iodonium, (4-methylphenyl)[(4-(2-methylpropyl)phenyl)iodonium], and the like, a triarylsulfonium such as triphenylsulfonium, diphenyl-4-thiophenoxyphenylsulfonium, and the like, bis[4-(diphenylsulfonio)phenyl]sulfide, and the like. For example, the anion may be one or more of hexafluorophosphate ($PF_6^-$), tetrafluoroborate ($BF_4^-$), hexafluoroantimonate ($SbF_6^-$), hexafluoroarsenate ($AsF_6^-$), and hexachloroantimonate ($SbCl_6^-$), but is not limited thereto.

The photo-radical initiator may be, for example, one or more of a thioxanthone-based, phosphorus-based, triazine-based, acetophenone-based, benzophenone-based, benzoin-based, and oxime-based initiator, but is not limited thereto.

The first coating layer 12 may further include nanoparticles. The nanoparticles may be organic nanoparticles, inorganic nanoparticles, or organic/inorganic hybrid nanoparticles. For example, the nanoparticles may be inorganic nanoparticles, for example silica, titania, barium titanate, zirconia, barium sulfate, alumina, hafnium oxide, or a combination thereof, but are not limited thereto.

The nanoparticles may be dispersed in the polysiloxane copolymer for the first coating layer 12 or chemically bound to the polysiloxane copolymer. The first coating layer 12 may further increase the surface hardness of the stacked transparent film 10 due to the nanoparticles.

For example, the nanoparticles may be nanoparticles in a sol state (hereinafter, referred to be as 'nanosol'). The nanosol may have a reaction site capable of causing a condensation reaction to occur at the surface of the nanoparticles, for example, at least one hydroxy group, an alkoxy group, halogen, a carboxyl group, or a combination thereof.

The nanosol may also be included in a hydrolysis and condensation polymerization reaction of silane compounds for preparing the siloxane copolymer, and thus the silane compounds may be bound to the condensation reaction site of the nanosol as well as have the hydrolysis and condensation polymerization reaction. Accordingly, the nanosol may be chemically bound to a main chain of the siloxane copolymer or form a cross-linking bond among chains of the siloxane copolymer. Accordingly, the siloxane copolymer may form a nanoparticle-polysiloxane composite having a three dimensional network structure due to the chemical bond between the siloxane copolymer and the nanoparticle, and thus further improve mechanical properties such as surface hardness of the stacked transparent film 10.

The nanoparticles may have an average particle diameter of about 1 nm to 200 nm, and, for example, about 5 nm to 50 nm within the range.

The nanoparticles may be included in an amount of about 0.1 parts by weight to about 60 parts by weight based on 100 parts by weight of the siloxane copolymer, for example, about 10 parts by weight to about 50 parts by weight within the range. Within the range, the surface hardness of the stacked transparent film 10 may be further increased without having substantial influence on the surface roughness and the light transmittance thereof.

The first coating layer 12 may further include a dye and/or a pigment absorbing at least a part of light in a visible ray region. For example, the first coating layer 12 may further include a pigment and/or a dye absorbing light in at least a portion of a wavelength region of about 570 nm to about 780 nm. For example, the pigment and/or the dye may be a violet dye or a violet pigment having a maximum absorption wavelength ($\lambda_{max}$) in a region of about 570 nm to about 780 nm, for example, a blue dye or a blue pigment having a maximum absorption wavelength ($\lambda_{max}$) in a region of less than or equal to about 400 nm and absorbing light over a wider range of about 570 nm to about 780 nm. The dye and/or pigment may offset a high yellow index (YI) due to the yellowness of the polymer film 11 and effectively lower the yellow index of the stacked transparent film 10. This effect is described herein.

The dye and/or pigment may be included in an amount of less than or equal to about 100 parts per million (ppm) based on 100 parts by weight of the siloxane copolymer, for example, less than or equal to about 90 ppm, less than or equal to about 80 ppm, less than or equal to about 70 ppm, less than or equal to about 60 ppm, or less than or equal to about 50 ppm within the range.

The first coating layer 12 may have a refractive index of about 1.45 to about 1.55 at a 550 nm wavelength. The first coating layer 12 having a refractive index within the range may be combined with the above polymer film 11 and thus increase the light transmittance of the stacked transparent film 10. The first coating layer 12 may have a thickness of about 5 μm to about 80 μm. Within the range, the thickness may be, for example, about 10 μm to about 80 μm, about 10 μm to about 70 μm, about 10 μm to about 60 μm, or about 10 μm to about 50 μm.

The second coating layer 13 may be positioned under the polymer film 11 (a side opposite the first coating layer) and thus improve optical characteristics of the stacked transparent film 10.

The second coating layer 13 may be any suitable colorless transparent material that can be adhered well to another layer without any particular limit. The second coating layer 13 may include, for example, a (meth)acrylate polymer, polycaprolactone, a urethane-acrylate copolymer, polyrotaxane, an epoxy resin, a siloxane copolymer, a perfluoropolyether polymer, or a combination thereof. For example, the second coating layer 13 may include a siloxane copolymer that is the same as or similar to the siloxane copolymer of the first coating layer 12.

The second coating layer 13 may, for example, have a refractive index of about 1.50 to about 1.65 at a wavelength of about 550 nm. The second coating layer 13 having a refractive index within the range may be combined with the above polymer film 11, and optionally, the first coating layer 12, and thus may increase the light transmittance of the stacked transparent film 10.

The second coating layer 13 may further include a dye and/or pigment absorbing at least a part of light in a visible ray region. For example, the second coating layer 13 may include a dye and/or a pigment absorbing light in at least a portion of a wavelength region of about 570 nm to about 780 nm. For example, the dye and/or pigment may be a violet dye or a violet pigment having a maximum absorption wavelength ($\lambda_{max}$) in a wavelength region of about 570 nm to about 780 nm and a blue dye or a blue pigment having a maximum absorption wavelength ($\lambda_{max}$) in a wavelength region of less than or equal to about 400 nm and absorbing light over a wider range of about 570 nm to about 780 nm. The dye and/or the pigment may offset a high yellow index (YI) due to the yellowness of the polymer film 11 and thus may effectively lower the yellow index of the stacked transparent film 10.

In an embodiment, the polymer film 11 may be exposed to a high temperature process such as high temperature deposition or high temperature annealing during a manufacturing process of a film and/or a display device and thus change into a yellow color. For example, as described above, when the polymer film 11 is the amide polymer film, the imide polymer film, or the amide-imide copolymer film including the amide structural unit and/or the imide structural unit, molecules of the amide polymer, the imide polymer, and/or the amide-imide copolymer may be freely rearranged during the exposure to the high temperature process, polymer inter-chains packing may occur, and an electron donor and an electron acceptor may be closely positioned, the amide polymer film, the imide polymer film, and/or the amide-imide copolymer film may have a structure that is a charge transfer complex and thus absorbs light in a short wavelength region, such as a blue wavelength region, due to electron transfer (exciton) among the potentials formed by the structure. Accordingly, since transmittance in the blue wavelength region of the polymer film 11 is deteriorated, there occurs a yellowing such that the polymer film 11 may turn yellowish.

The second coating layer 13 may include a dye and/or a pigment absorbing light in at least a portion of an about 570 nm to about 780 nm wavelength region and may offset a high yellow index due to the yellowness of the polymer film 11 and thus lower the yellow index of the stacked transparent film 10. In this way, the second coating layer 13 may complement the optical properties of the polymer film 11 and thus improve the optical properties of the stacked transparent film 10. As described above, a blue pigment, blue dye, violet pigment, or violet dye absorbing light in at least a portion of an about 570 nm to about 780 nm wavelength region may be included in the first coating layer 12.

In an embodiment, the blue dye or blue pigment may have a maximum absorption wavelength ($\lambda_{max}$) in a region of less than or equal to about 400 nm and absorb light over a wide range of about 570 nm to about 780 nm.

The violet pigment or violet dye may be, for example, dioxazine violet, first violet B, methylviolet, indanthrone brilliant violet, or dioxazine violet, but is not limited thereto.

The blue dye or blue pigment may be, for example, a metal phthalocyanine pigment, an indanthrone pigment, an indophenol pigment, and the like, and may include, for example, a phthalocyanine metal complex such as copper phthalocyanine or chloro copper phthalocyanine, chloro aluminum phthalocyanine, titanyl phthalocyanine, vanadic acid phthalocyanine, magnesium phthalocyanine, zinc phthalocyanine, iron phthalocyanine, cobalt phthalocyanine, and the like, but is not limited thereto.

The dye and/or pigment may be included in an amount of less than or equal to about 100 ppm based on a total amount of the second coating layer 13, for example, less than or equal to about 90 ppm, less than or equal to about 80 ppm, less than or equal to about 70 ppm, less than or equal to about 60 ppm, or less than or equal to about 50 ppm within the range.

The second coating layer 13 may have a thickness of about 30 nm to about 300 nm. Within the range, the thickness may be, for example, about 30 nm to about 250 nm, about 40 nm to about 250 nm, or about 40 nm to about 200 nm, and, for example, about 50 nm to about 180 nm within the range.

For example, the first coating layer 12 and the second coating layer 13 may be respectively formed on one surface or both surfaces of the polymer film 11 through a solution process or a deposition process. For example, the first coating layer 12 and the second coating layer 13 may be manufactured as films and then laminated on one surface or both surfaces of the polymer film 11. For example, the first coating layer 12 and the second coating layer 13 may be respectively coated through the solution process such as bar coating, spin coating, slit coating, dip coating, roll coating, flow coating, dye coating, or inkjet coating, and then cured. The curing may be optical curing and/or thermal curing, and herein, the optical curing may, for example, include irradiation with light at a wavelength of less than or equal to about 400 nm with a light dose of about 10 millijoules per square centimeter (mJ/cm$^2$) to about 1000 mJ/cm$^2$, and the thermal curing may, for example, include a heat treatment at about 40° C. to about 200° C. for about 1 hour to about 30 hours. Any suitable method of heat treatment can be used.

The stacked transparent film 10 may have improved optical properties and mechanical characteristics, and, simultaneously, flexibility, by disposing the first coating layer 12 and/or the second coating layer 13 on one surface or both surfaces of the polymer film 11. That is, disposing the first coating layer 12 on a first surface and disposing the second coating layer 13 on a second surface that is on a side opposite the first surface of the polymer film 11. Accordingly, the stacked transparent film 10 may be usefully applied to a substrate for a display device and/or a window requiring transparency.

For example, the stacked transparent film 10 may have a greater light transmittance than the polymer film 11. The light transmittance of the stacked transparent film 10 may be, for example, greater than or equal to about 82% in a visible ray region of about 380 nm to about 780 nm, for example, greater than or equal to about 85%, greater than or equal to about 87%, greater than or equal to about 88%, greater than or equal to about 89%, or greater than or equal to about 89.5% within the range.

For example, the yellow index of the stacked transparent film 10, which is measured according to ASTM D1925, may have a smaller absolute value than the absolute value of the yellow index of the polymer film 11, as measured according to ASTM D1925. The absolute value of the yellow index of the stacked transparent film 10 may be less than or equal to about 2.0, for example, less than or equal to about 1.8 within the range, for example, less than or equal to about 1.5 within the range, for example, less than or equal to about 1.3 within the range, for example, less than or equal to about 1.2 within the range, and for example, less than or equal to about 1.0 within the range, each as measured according to ASTM D1925.

For example, the stacked transparent film 10 may have a higher pencil hardness, which is measured according to ASTM D3363, than the pencil hardness of the polymer film 11, as measured according to ASTM D3363. The pencil hardness of the stacked transparent film 10 may be, for example, greater than or equal to 4H, for example, greater than or equal to 5H within the range, each as measured according to ASTM D3363.

For example, the stacked transparent film 10 may have improved optical properties and mechanical characteristics, and simultaneously, have a light transmittance of greater than or equal to about 85%, a pencil hardness of greater than or equal to 4H, as measured according to ASTM D3363, and an absolute value of a yellow index of less than or equal to about 2.0, as measured according to ASTM D1925.

For example, the stacked transparent film 10 may have improved optical properties and mechanical characteristics, and simultaneously, have a light transmittance of greater than or equal to about 88%, a pencil hardness of greater than or equal to 5H, as measured according to ASTM D3363, and an absolute value of a yellow index of less than or equal to about 1.5, as measured according to ASTM D1925.

For example, the stacked transparent film 10 may have improved optical properties and mechanical characteristics, and simultaneously, satisfy (have) a light transmittance of greater than or equal to about 89%, a pencil hardness of greater than or equal to 5H, as measured according to ASTM D3363, and an absolute value of a yellow index of less than or equal to about 1.3, as measured according to ASTM D1925.

For example, the stacked transparent film 10 may have improved optical properties and mechanical characteristics, and simultaneously, satisfy (have) a light transmittance of greater than or equal to about 89.5%, a pencil hardness of greater than or equal to 5H, as measured according to ASTM D3363, and an absolute value of a yellow index of less than or equal to about 1.0, as measured according to ASTM D1925.

As used herein, when the stacked transparent film 10 simultaneously has a particular light transmittance, pencil hardness, and absolute value of a yellow index, it means that the stacked transparent film 10 has each of the light transmittance, pencil hardness, and absolute value of a yellow index properties at the same time.

Figure 2:
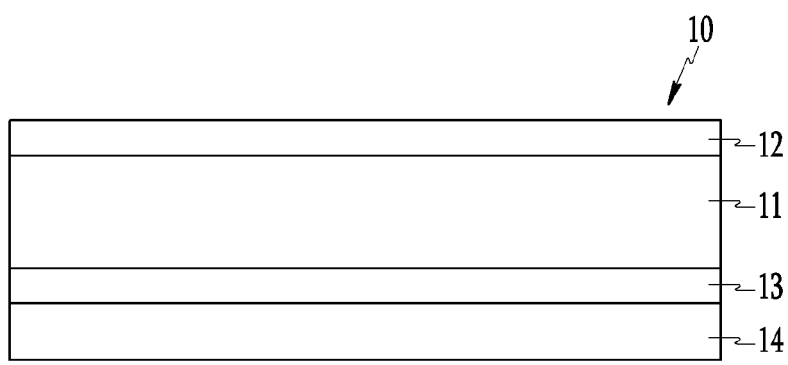
FIG. 2 is a cross-sectional view of a stacked transparent film according to another embodiment.

FIG. 2 is a cross-sectional view showing a stacked transparent film according to another embodiment.

Referring to FIG. 2, the stacked transparent film 10 according to the embodiment includes the polymer film 11, the first coating layer 12 on a first side of the polymer film 11, and the second coating layer 13 on a side opposite the first side of the polymer film 11, like the above embodiment. The polymer film 11, the first coating layer 12, and the second coating layer 13 are the same as described above.

However, the stacked transparent film 10 according to an embodiment may further include a transparent adhesive layer 14 on a side of the second coating layer 13 that is opposite the polymer film 11, unlike the above embodiment.

The transparent adhesive layer 14 may include an optically transparent adhesive or tackifier, for example, an optical clear adhesive (OCA) or a pressure sensitive adhesive (PSA). The transparent adhesive layer 14 may play a role of bonding the stacked transparent film 10 and a lower layer when applied to a device such as a display device.

The transparent adhesive layer 14 may have a refractive index of about 1.45 to about 1.55. When the refractive index is within the range, the transparent adhesive layer 14 may be combined with the polymer film 11 and the first and second coating layers 12 and 13, respectively, and thus increase the light transmittance of the stacked transparent film 10.

The transparent adhesive layer 14 may, for example, have a thickness of about 5 µm to about 200 µm. Within the range, the transparent adhesive layer 14 may, for example, have a thickness of about 5 µm to about 150 µm, about 10 µm to about 120 µm, about 15 µm to about 100 µm, or about 20 µm to about 80 µm.

The stacked transparent film 10 may be applied to all the fields requiring optical transparency. The stacked transparent film 10 may be applied to various display devices. The stacked transparent film 10 may be, for example, usefully applied to a substrate for a display device or a window for a display device. For example, the stacked transparent film 10 may be applied as a window for a display device.

Figure 3:
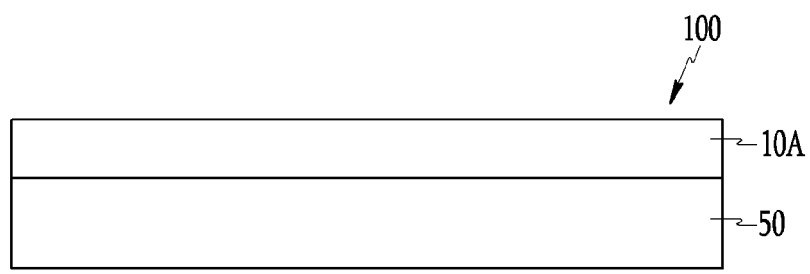
FIG. 3 is a cross-sectional view of a display device according to an embodiment.

FIG. 3 is a cross-sectional view showing a display device 100 according to an embodiment.

Referring to FIG. 3, a display device 100 according to an embodiment includes a display panel 50 and a window 10A.

The display panel 50 may be, for example, an organic light emitting diode display panel or a liquid crystal display panel, for example, a bendable display panel, a foldable display panel, or a rollable display panel.

The window 10A may be the polymer film 11 or the stacked transparent film 10 including the polymer film 11, and may be disposed on an observer side.

Another layer (not shown) may be interposed between the display panel 50 and the window 10A, for example, a single polymer layer or a plurality of polymer layers (not shown) and optionally a transparent adhesion layer (not shown) may be further included. For example, when the stacked transparent film 10 is used, the first coating layer 12 (if present) may be located on a side of the polymer film 11 opposite the display panel 50; and the second coating layer 13 (if present) may be located between the polymer film 11 and the display panel 50. Similarly, with reference to the stacked transparent film 10 of FIG. 2, the first coating layer 12 (if present) may be located on a side of the polymer film 11 opposite the display panel 50; the second coating layer 13 (if present) may be located between the polymer film 11 and the display panel 50; and the transparent adhesive layer 14 may be located between the second coating layer 13 and the display panel 50.

Figure 4:
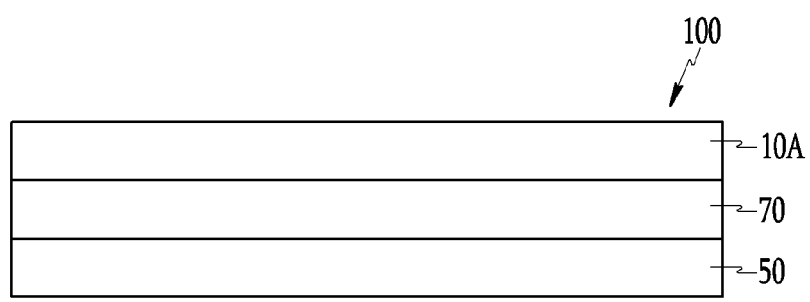
FIG. 4 is a cross-sectional view of a display device according to another embodiment.

FIG. 4 is a cross-sectional view of a display device 100 according to another embodiment.

Referring to FIG. 4, the display device 100 according to the present embodiment includes a display panel 50, a window 10A, and a touch screen panel 70 between the display panel 50 and the window 10A.

The display panel 50 may be, for example, an organic light emitting diode display panel or a liquid crystal display panel, for example, a bendable display panel, a foldable display panel, or a rollable display panel.

The window 10A may be the polymer film 11 or the stacked transparent film 10 including the polymer film 11 and may be disposed on an observer side.

The touch screen panel 70 may be disposed adjacent to each of the window 10A and the display panel 50. The touch screen panel 70 is positioned so as to recognize the touched position and the position change when the window is touched by a human hand, or by another device or material and then to output a touch signal. The driving module (not shown) may monitor a position where the touch screen panel is touched based upon the output touch signal; recognize an icon marked at the touched position; and control the device response to carry out a function corresponding to the recognized icon, and, as a result, the function performance results are expressed on the display panel 50.

Another layer may be interposed between the touch screen panel 70 and the window 10A, for example, a single polymer layer or a plurality of polymer layers (not shown) and optionally a transparent adhesion layer (not shown) may be further included.

Another layer (not shown) may be disposed between the touch screen panel 70 and the display panel 50, and may further include, for example, a single polymer layer or a plurality of polymer layers (not shown) and optionally a transparent adhesive layer (not shown). For example, when the stacked transparent film 10 is used, the first coating layer 12 (if present) may be located on a side of the polymer film 11 opposite the touch screen panel 70; and the second coating layer 13 (if present) may be located between the polymer film 11 and the touch screen panel 70. Similarly, with reference to the stacked transparent film 10 of FIG. 2, the first coating layer 12 (if present) may be located on a side of the polymer film 11 opposite the touch screen panel 70; the second coating layer 13 (if present) may be located between the polymer film 11 and the touch screen panel 70; and the transparent adhesive layer 14 may be located between the second coating layer 13 and the touch screen panel 70.

The display device may be applied to various electronic devices, for example, a smart phone, a tablet PC, a camera, a touch screen device, but is not limited thereto.

Hereinafter, the present disclosure is illustrated in more detail with reference to examples. However, these examples are exemplary, and the present disclosure is not limited thereto.

EXAMPLES

Preparation of Amide Group-Containing Oligomer

Synthesis Example 1

1 molar equivalent (0.122 mol, 39.2 g) of 2,2'-bis(trifluoromethyl)benzidine (TFDB) and 2.8 molar equivalents (0.343 mol, 27.11 g) of pyridine are dissolved in 700 g of N,N-dimethyl acetamide as a solvent in a round-bottomed flask, the TFDB remaining there is washed away with 50 ml of dimethyl acetamide (DMAC), 0.7 molar equivalents (0.086 mol, 17.4 g) of terephthaloyl chloride (TPCL) is separately four times added to the TFDB solution at 25° C., and the obtained mixture is fervently stirred for 15 minutes.

Subsequently, the resulting solution is stirred under a nitrogen atmosphere for 2 hours, 7 L of a NaCl solution containing 350 g of NaCl is added thereto, and the mixture is stirred for 10 minutes. Then, a solid therein is filtered, and the product is then twice resuspended in 5 L of deionized water and refiltered. Subsequently, the final filtered product is appropriately compressed to remove most of the residual water, and dried at 90° C. under vacuum for 48 hours to obtain an amide group-containing oligomer represented by Chemical Formula A. A number average molecular weight of the obtained amide group-containing oligomer is about 997 g/mol.

Chemical Formula A

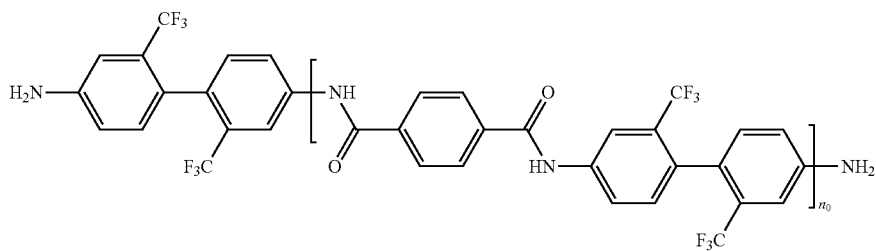

Synthesis Example 2

An amide group-containing oligomer is synthesized according to the same method as Synthesis Example 1 except for using 0.32 molar equivalents of 4,4'-biphenyldicarbonylchloride (BPCL) and 0.18 molar equivalents of the TPCL instead of the 0.7 molar equivalents of the TPCL.

Synthesis Example 3

An amide group-containing oligomer represented by Chemical Formula B is synthesized according to the same method as Synthesis Example 1 except for using 0.4 molar equivalents of BPCL instead of 0.7 molar equivalents of the TPCL.

Chemical Formula B

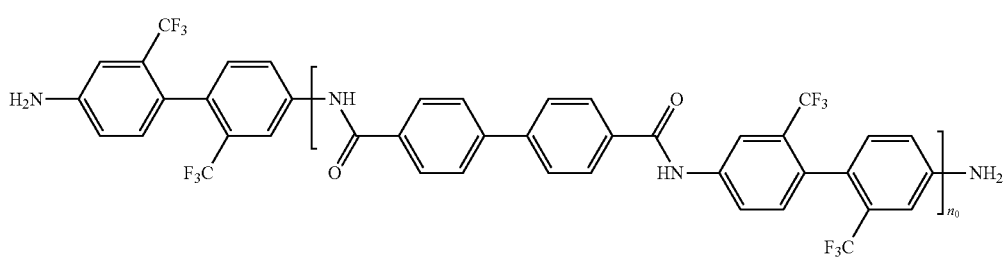

Synthesis Example 4

An amide group-containing oligomer is synthesized according to the same method as Synthesis Example 1 except for using 0.51 molar equivalents of the TPCL instead of 0.7 molar equivalents of the TPCL.

Synthesis Example 5

An amide group-containing oligomer is synthesized according to the same method as Synthesis Example 1 except for using 0.55 molar equivalents of the TPCL instead of 0.7 molar equivalents of the TPCL.

Synthesis Example 6

An amide group-containing oligomer is synthesized according to the same method as Synthesis Example 1 except for using 0.40 molar equivalents of the TPCL instead of 0.7 molar equivalents of the TPCL.

Synthesis Example 7

An amide group-containing oligomer is synthesized according to the same method as Synthesis Example 1 except for using 0.43 molar equivalents of the TPCL instead of 0.7 molar equivalents of the TPCL.

Synthesis Example 8

An amide group-containing oligomer is synthesized according to the same method as Synthesis Example 1 except for using 0.10 molar equivalents of BPCL instead of 0.7 molar equivalents of the TPCL.

Synthesis Example 9

An amide group-containing oligomer is synthesized according to the same method as Synthesis Example 1 except for using 0.30 molar equivalents of BPCL instead of 0.7 molar equivalents of the TPCL.

Synthesis Example 10

An amide group-containing oligomer is synthesized according to the same method as Synthesis Example 1 except for using 0.43 molar equivalents of 4,4'-oxybis (benzoyl chloride) (ODBC) instead of 0.7 molar equivalents of the TPCL.

Preparation of Polymer Film

Preparation Example 1

21.7 g (0.0152 mol) of the amide group-containing oligomer according to Synthesis Example 1 and 143 ml of dimethyl acetamide (DMAc) are put in a 250 ml 4-necked double wall reactor preheated at 30° C. and equipped with a mechanical stirrer and a nitrogen inlet. Subsequently, the solution is stirred at 30° C. under a nitrogen atmosphere until the oligomer is completely dissolved, 3.73 g (0.0084 mol) of 4,4'-(hexafluoroisopropylidene)diphthalic anhydride (6FDA) and 2.00 g (0.0068 mol) of 3,3',4,4'-biphenyltetracarboxylic dianhydride (BPDA) are slowly added thereto. Then, 10 ml of dimethyl acetamide (DMAc) is further added thereto, and the obtained solution is stirred for 48 hours to obtain an amide-amic acid copolymer solution having a solid concentration of 16 wt %. After decreasing a temperature down to 25° C., 4.6 g of acetic anhydride is added to the amide-amic acid copolymer solution, the mixture is stirred for 30 minutes, 3.6 g of pyridine is added thereto, and the obtained mixture is further stirred for 48 hours to obtain an amide-imide copolymer solution.

Subsequently, the obtained amide-imide copolymer solution is coated on a glass plate and dried on a 80° C. hot plate for one hour, put in an oven with the glass plate, heat-treated up to 250° C. at 3° C./min, slowly cooled, and then peeled off from the glass plate to obtain an about 80 μm-thick amide-imide copolymer film.

Preparation Example 2

An about 50 μm-thick amide-imide copolymer film is obtained according to the same synthesis method as Preparation Example 1 except for using 21.6 g (0.0152 mol) of the amide group-containing oligomer according to Synthesis Example 2 instead of the amide group-containing oligomer according to Synthesis Example 1, 3.71 g (0.0084 mol) of 6FDA, and 2.01 g (0.0068 mol) of BPDA.

Preparation Example 3

An about 50 μm-thick amide-imide copolymer film is obtained according to the same synthesis method as Preparation Example 1 except for using 21.3 g (0.0152 mol) of the amide group-containing oligomer according to Synthesis Example 3 instead of the amide group-containing oligomer according to Synthesis Example 1, 3.38 g (0.0076 mol) of 6FDA, and 2.24 g (0.0076 mol) of BPDA.

Preparation Example 4

An about 80 μm-thick amide-imide copolymer film is obtained according to the same synthesis method as Preparation Example 1 except for using 21.7 g (0.0152 mol) of the amide group-containing oligomer according to Synthesis Example 1, 3.38 g (0.0076 mol) of 6FDA, and 2.24 g (0.0076 mol) of BPDA.

Preparation Example 5

An about 50 μm-thick amide-imide copolymer film is obtained according to the same synthesis method as Preparation Example 4.

Preparation Example 6

An about 76 μm-thick amide-imide copolymer film is obtained according to the same synthesis method as Preparation Example 1 except for using 20.4 g (0.0152 mol) of the amide group-containing oligomer according to Synthesis Example 4 instead of the amide group-containing oligomer according to Synthesis Example 1, 3.72 g (0.0084 mol) of 6FDA, and 2.01 g (0.0068 mol) of BPDA.

Preparation Example 7

An about 50 μm-thick amide-imide copolymer film is obtained according to the same synthesis method as Preparation Example 6.

Preparation Example 8

An about 50 μm-thick amide-imide copolymer film is obtained according to the same synthesis method as Preparation Example 1 except for using 20.7 g (0.0152 mol) of the amide group-containing oligomer according to Synthesis Example 5 instead of the amide group-containing oligomer according to Synthesis Example 1, 3.38 g (0.0076 mol) of 6FDA, and 2.24 g (0.0076 mol) of BPDA.

Preparation Example 9

An about 80 μm-thick amide-imide copolymer film is obtained according to the same synthesis method as Preparation Example 1 except for using 19.7 g (0.0152 mol) of the amide group-containing oligomer according to Synthesis Example 6 instead of the amide group-containing oligomer according to Synthesis Example 1, 5.63 g (0.0127 mol) of 6FDA, and 0.75 g (0.0025 mol) of BPDA.

Preparation Example 10

An about 50 μm-thick amide-imide copolymer film is obtained according to the same synthesis method as Preparation Example 1 except for using 19.9 g (0.0152 mol) of the amide group-containing oligomer according to Synthesis Example 7 instead of the amide group-containing oligomer according to Synthesis Example 1, 2.37 g (0.0053 mol) of 6FDA, and 2.90 g (0.0099 mol) of BPDA.

Preparation Example 11

An about 75 μm-thick amide-imide copolymer film is obtained according to the same synthesis method as Preparation Example 1 except for using 20.7 g (0.0152 mol) of the amide group-containing oligomer according to Synthesis Example 5 instead of the amide group-containing oligomer according to Synthesis Example 1 and 4.47 g (0.0152 mol) of 2,3,3',4'-biphenyltetracarboxylic acid dianhydride (aBPDA) instead of the 6FDA and the BPDA.

Preparation Example 12

An about 46 μm-thick amide-imide copolymer film is obtained according to the same synthesis method as Preparation Example 1 except for using 20.4 g (0.0152 mol) of the amide group-containing oligomer according to Synthesis Example 4 instead of the amide group-containing oligomer according to Synthesis Example 1 and 2.01 g (0.0068 mol) of BPDA and 2.46 g (0.0084 mol) of aBPDA instead of the 6FDA and the BPDA.

Preparation Example 13

An about 80 μm-thick amide-imide copolymer film is obtained according to the same method as Preparation Example 1 except for adding about 20 ppm of dioxazine violet (Violet Pigment, MVC, Iridos Co., Ltd.) ($\lambda_{max}$=600-610 nm) in the amide-imide copolymer solution of the preparation Example 1, and stirring the mixture for about 30 minutes with a stirrer.

Comparative Preparation Example 1

13.26 g (0.0414 mol) of 2,2'-bis(trifluoromethyl)benzidine (TFDB) and 121 ml of dimethyl acetamide (DMAc) are put in a 250 ml 4-necked double wall reactor equipped with a mechanical stirrer and a nitrogen inlet. Subsequently, the mixture is stirred under a nitrogen atmosphere until the TFDB is completely dissolved therein, and 4.60 g (0.0104 mol) of 4,4'-(hexafluoroisopropylidene)diphthalic anhydride (6FDA) and 9.14 g (0.0311 mol) of 3,3',4,4'-biphenyltetracarboxylic dianhydride (BPDA) are slowly added thereto. Then, 10 ml of dimethyl acetamide (DMAc) is further added thereto, and the obtained mixture is stirred for 48 hours to obtain an amic acid solution having a solid concentration of 18 wt %. Subsequently, 12.7 g of acetic anhydride is added to the amic acid solution, the mixture is stirred for 30 minutes, 9.8 g of pyridine is added thereto, and the obtained mixture is further stirred for 48 hours to obtain an imide solution.

Subsequently, the imide solution is coated on a glass plate, dried on an 80° C. hot plate for one hour, put in an oven with the glass plate, heat-treated up to 250° C. at 3° C./min, slowly cooled down, and finally peeled off from the glass plate to obtain an about 80 μm-thick polyimide film.

Comparative Preparation Example 2

An about 90 μm-thick polyimide film is obtained according to the same synthesis method as Comparative Preparation Example 1 except for using 6.09 g (0.0207 mol) of BPDA, 9.20 g (0.0207 mol) of 6FDA, and 13.26 g (0.0414 mol) of TFDB.

Comparative Preparation Example 3

An about 80 μm-thick polyimide film is obtained according to the same synthesis method as Comparative Preparation Example 1 except for using 2.44 g (0.0083 mol) of BPDA, 14.71 g (0.0331 mol) of 6FDA, and 13.26 g (0.0414 mol) of TFDB.

Comparative Preparation Example 4

An about 40 μm-thick polyimide film is obtained according to the same synthesis method as Comparative Preparation Example 1 except for using 18.39 g (0.0414 mol) of BPDA, and 13.26 g (0.0414 mol) of TFDB.

Comparative Preparation Example 5

An about 59 μm-thick polyimide film is obtained according to the same synthesis method as Comparative Preparation Example 1 except for using 2.44 g (0.0083 mol) of BPDA, 14.71 g (0.0331 mol) of 6FDA, and 12.86 g (0.0402 mol) of TFDB and additionally, 0.28 g (0.00124 mol) of 6-amino-2-(4-aminophenyl)benzoxazole (6ABO).

Comparative Preparation Example 6

21.15 g (0.0476 mol) of 4,4'-(hexafluoroisopropylidene) diphthalic anhydride (6FDA) and 116.5 ml of tetrahydrofuran (THF) are put in a 250 ml 4-necked double wall reactor equipped with a mechanical stirrer and a nitrogen inlet. Subsequently, the mixture is stirred under a nitrogen atmosphere until the 6FDA is completely dissolved, and 1.86 g (0.00238 mol) of aminopropyl terminated polydimethylsiloxane (MW=780 g/mol, aminopropyl terminated PDMS) is slowly added thereto. The obtained mixture is stirred at room temperature under a nitrogen atmosphere for 2 hours, 3.8 g of acetic acid is added thereto, and the obtained mixture is stirred for one hour. Subsequently, 14.48 g (0.0452 mol) of 2,2'-bis(trifluoromethyl)benzidine (TFDB) and 10 ml of THF are further added thereto, and the obtained solution is stirred for 48 hours to obtain an amic acid solution having a solid concentration of 25 wt %. Subsequently, 13.5 g of acetic anhydride is added to the amic acid solution, the mixture is stirred for 30 minutes, 11.5 g of pyridine is added thereto, and the obtained mixture is further stirred for 48 hours to obtain an imide solution.

Subsequently, the obtained imide solution is coated on a glass plate, dried on an 80° C. hot plate for one hour, put in an oven with the glass plate, heat-treated up to 250° C. at 3° C./min, slowly cooled down, and peeled off from the glass plate to obtain an about 50 μm-thick polyimide film.

Comparative Preparation Example 7

An about 30 μm-thick polyimide film is obtained according to the same method as Comparative Preparation Example 6 except for using 21.15 g (0.0476 mol) of 6FDA, 7.43 g (0.00952 mol) of aminopropyl terminated PDMS, and 12.19 g (0.0381 mol) of TFDB.

Comparative Preparation Example 8

An about 30 μm-thick polyimide film is obtained according to the same method as Comparative Preparation Example 6 except for using 21.15 g (0.0476 mol) of 6FDA, 0.37 g (0.000476 mol) of aminopropyl terminated PDMS, and 15.09 g (0.0471 mol) of TFDB.

Comparative Preparation Example 9

An about 30 μm-thick polyimide film is obtained according to the same method as Comparative Preparation Example 6 except for using 21.15 g (0.0476 mol) of 6FDA, 1.86 g (0.00238 mol) of aminopropyl terminated PDMS, and 14.48 g (0.0452 mol) of TFDB.

Comparative Preparation Example 10

An about 50 μm-thick polyimide film is obtained according to the same synthesis method as Preparation Example 1 except for using 21.7 g (0.0152 mol) of the amide group-containing oligomer according to Synthesis Example 1, 2.25 g (0.0051 mol) of 6FDA, and 2.98 g (0.0101 mol) of BPDA.

Comparative Preparation Example 11

An about 50 μm-thick polyimide film is obtained according to the same synthesis method as Preparation Example 1 except for using 18.0 g (0.0152 mol) of the amide group-containing oligomer according to Synthesis Example 8 instead of the amide group-containing oligomer according to Synthesis Example 1, and using 4.5 g (0.0101 mol) of 6FDA, and 1.49 g (0.0051 mol) of BPDA.

Comparative Preparation Example 12

An about 50 μm-thick polyimide film is obtained according to the same synthesis method as Preparation Example 1 except for using 20.2 g (0.0152 mol) of the amide group-containing oligomer according to Synthesis Example 9 instead of the amide group-containing oligomer according to Synthesis Example 1, and using 3.86 g (0.0087 mol) of 6FDA, and 1.92 g (0.0065 mol) of BPDA.

Comparative Preparation Example 13

An about 50 μm-thick polyimide film is obtained according to the same synthesis method as Preparation Example 1 except for using 18.0 g (0.0152 mol) of the amide group-containing oligomer according to Synthesis Example 8 instead of the amide group-containing oligomer according to Synthesis Example 1, and using 3.0 g (0.0068 mol) of 6FDA, and 2.48 g (0.0084 mol) of BPDA.

Comparative Preparation Example 14

An about 52 μm-thick polyimide film is obtained according to the same synthesis method as Preparation Example 1 except for using 22.0 g (0.0152 mol) of the amide group-containing oligomer according to Synthesis Example 10 instead of the amide group-containing oligomer according to Synthesis Example 1, and using 2.37 g (0.0053 mol) of 6FDA, and 2.90 g (0.0099 mol) of BPDA.

Evaluation 1

A thickness, a refractive index, a light transmittance, a yellow index, an elastic modulus, and a pencil hardness of the polymer films according to Preparation Examples 1 to 12 and Comparative Preparation Examples 1 to 14 are measured and evaluated.

The film thickness is measured by using a Micrometer instrument (Mitutoyo Corp.).

The refractive index is measured at a wavelength of 550 nm in a visible ray region with an Ellipsometer (M-2000, J. A. Woollam Co.) by setting a Gen-Osc model.

The light transmittance is measured as Y(D65) in a wavelength region of 380 nm to 780 nm by using a UV spectrophotometer (cm-3600d, Konika Minolta Inc.).

The yellow index (YI) is measured according to ASTM D1925 by using the UV spectrophotometer (cm-3600d, Konika Minolta Inc.).

The elastic modulus is evaluated by extending a film specimen having a size of 10 mm (width) and 50 mm (length) at room temperature at a speed of 25 mm/min with an Instron 3365 (Instron Corp.), measuring five times per sample according to ASTM D882, and averaging the five measurements.

The pencil hardness is evaluated by measuring five times per sample according to ASTM D3363, with a vertical load of 500 g at a speed of 60 mm/min by using a pencil hardness-measuring device and a Mitsubishi pencil, and then the highest hardness is determined when the film is not scratched.

The results are shown in Tables 1 and 2.

TABLE 1

| | Thickness (μm) | Refractive index (@ 550 nm) | Light transmittance (%) | Yellow index (YI, D1925) | Elastic Modulus (GPa) | Pencil hardness |
|---|---|---|---|---|---|---|
| Preparation Example 1 | 80 | 1.69 | 88.3 | 3.1 | 6.1 | 3H |
| Preparation Example 2 | 50 | 1.75 | 88.1 | 3.0 | 5.8 | 2H |
| Preparation Example 3 | 50 | 1.74 | 89.4 | 2.6 | 6.1 | 2H |

TABLE 1-continued

|  | Thickness (μm) | Refractive index (@ 550 nm) | Light transmittance (%) | Yellow index (YI, D1925) | Elastic Modulus (GPa) | Pencil hardness |
|---|---|---|---|---|---|---|
| Preparation Example 4 | 80 | 1.71 | 87.9 | 4.0 | 5.7 | 3H |
| Preparation Example 5 | 50 | 1.71 | 88.3 | 3.0 | 6.1 | 2H |
| Preparation Example 6 | 76 | 1.69 | 88.3 | 3.6 | 5.7 | 3H |
| Preparation Example 7 | 50 | 1.69 | 88.4 | 3.0 | 5.9 | 2H |
| Preparation Example 8 | 50 | 1.71 | 88.9 | 2.2 | 6.0 | 2H |
| Preparation Example 9 | 80 | 1.67 | 89.2 | 2.5 | 5.5 | 2H |
| Preparation Example 10 | 50 | 1.71 | 87.8 | 3.6 | 6.5 | 3H |
| Preparation Example 11 | 75 | 1.72 | 88.5 | 2.5 | 5.6 | 3H |
| Preparation Example 12 | 46 | 1.74 | 88.2 | 3.2 | 5.9 | 2H |
| Preparation Example 13 | 80 | 1.69 | 87.2 | 2.3 | 6.1 | 3H |

TABLE 2

|  | Thickness (μm) | Refractive index (@ 550 nm) | Light transmittance (%) | Yellow index (YI, D1925) | Elastic Modulus (GPa) | Pencil hardness |
|---|---|---|---|---|---|---|
| Comparative Preparation Example 1 | 80 | 1.76 | 87.3 | 4.8 | 5.3 | 2H |
| Comparative Preparation Example 2 | 90 | 1.64 | 89.0 | 3.2 | 4.8 | B |
| Comparative Preparation Example 3 | 80 | 1.63 | 89.9 | 2.0 | 4.2 | HB |
| Comparative Preparation Example 4 | 40 | 1.59 | 90.7 | 1.2 | 3.7 | <6B |
| Comparative Preparation Example 5 | 59 | 1.61 | 90.0 | 2.0 | 4.3 | HB |
| Comparative Preparation Example 6 | 50 | 1.56 | 90.7 | 0.8 | 2.7 | <6B |
| Comparative Preparation Example 7 | 30 | 1.55 | 91.5 | 0.6 | 1.9 | <6B |
| Comparative Preparation Example 8 | 30 | 1.59 | 90.7 | 1.2 | 2.8 | <6B |
| Comparative Preparation Example 9 | 30 | 1.59 | 91.0 | 1.4 | 2.1 | <6B |
| Comparative Preparation Example 10 | 50 | 1.76 | 79.0 | 21.7 | 6.9 | 3H |
| Comparative Preparation Example 11 | 50 | 1.63 | 89.7 | 1.9 | 4.4 | HB |
| Comparative Preparation Example 12 | 50 | 1.69 | 88.9 | 2.3 | 5.2 | F |
| Comparative Preparation Example 13 | 50 | 1.68 | 90.3 | 2.4 | 5.2 | 3B |
| Comparative Preparation Example 14 | 52 | 1.70 | 88.5 | 2.6 | 4.7 | B |

Preparation of Composition for Coating Layer

Synthesis Example 11: Composition for Hard Coating Layer 50 g of a monomer mixture of 98 mol % of 2-(3,4-epoxycyclohexyl)ethyltriethoxysilane (Sigma-Aldrich Co., Ltd.), 1 mol % of 2-(3,4-epoxycyclohexyl)ethylmethyldiethoxysilane (Gelest Inc.), and 1 mol % of 2-hydroxy-4-(3-triethoxysilylpropoxy)diphenylketone (Gelest Inc.) is put in a 200 ml 2-necked flask. 2 mol % of KOH and 1 mol % of water based on a total amount of the monomer mixture are added thereto, and the obtained mixture is stirred at 65° C. for 4 hours. The resultant is distilled under a reduced pressure to remove water and alcohol remaining therein to prepare a siloxane copolymer, and methylethylketone is added thereto to adjust its solid content to 90 wt %

A weight average molecular weight of the siloxane copolymer is 6,200 g/mol when examined through gel permeation chromatography.

100 parts by weight of the siloxane copolymer, 10 parts by weight of a cross-linking agent CY-179 (CIBA-GEIGY Corp.), and 5 parts by weight of an initiator Irgacure-250 (BASF SE) are mixed to prepare a composition for a first coating layer.

Synthesis Example 12: Composition for Rear Coating Layer

About 34 ppm of dioxazine violet (Violet Pigment, MVC, Iridos Co., Ltd.) ($\lambda_{max}$=600-610 nm) based on 100 parts by weight of the siloxane copolymer is added to the composition of Synthesis Example 11, and the mixture is stirred for about 30 minutes with a stirrer to obtain a composition for a second coating layer.

Synthesis Example 13: Composition for Rear Coating Layer

Silica nanoparticles are added to an Acryl-based polymer (Sukgyung AT Co. Ltd.) and the mixture is stirred for about 30 minutes with a stirrer to obtain a composition for a second coating layer.

Formation of Stacked Transparent Film

Example 1

The composition of Synthesis Example 11 is coated on one surface of the amide-imide copolymer film according to Preparation Example 1, pre-annealed at 90° C. for 2 minutes, and irradiated with a 200 W high pressure mercury lamp at a wavelength region of 240 nm to 400 nm for 96 seconds. Subsequently, the irradiated composition is post-annealed at 200° C. for 1 hour to form an about 10 μm-thick first coating layer (a refractive index: 1.51).

Subsequently, the composition of Synthesis Example 12 is coated to be about 100 nm thick on the other surface of the amide-imide copolymer film, pre-annealed at 90° C. for 2 minutes, and irradiated by using a 200 W high pressure mercury lamp at a wavelength region of 240 nm to 400 nm for 96 seconds to form an about 90 nm-thick second coating layer (a refractive index: 1.63). Then, a transparent adhesive layer (refractive index: 1.53) is formed by attaching a 50 μm-thick transparent adhesive (OCA, 3M) on one surface of the second coating layer to manufacture a stacked transparent film.

Examples 2 to 13

Each stacked transparent film is manufactured according to the same method as Example 1 except for using the amide-imide copolymer films of Preparation Examples 2 to 13, respectively, instead of the amide-imide copolymer film of Preparation Example 1.

Example 14

The composition of Synthesis Example 11 is coated on one surface of the amide-imide copolymer film according to Preparation Example 13, pre-annealed at 90° C. for 2 minutes, and irradiated with a 200 W high pressure mercury lamp at a wavelength region of 240 nm to 400 nm for 96 seconds. Subsequently, the irradiated composition is post-annealed at 200° C. for 1 hour to form an about 10 μm-thick first coating layer (a refractive index: 1.51).

Subsequently, a transparent adhesive layer (refractive index: 1.53) is formed by attaching a 50 μm-thick transparent adhesive (OCA, 3M) on on the other surface of the amide-imide copolymer film to manufacture a stacked transparent film.

Comparative Examples 1 to 14

Each stacked transparent film is manufactured according to the same method as Example 1 except for using the polyimide films or the amide-imide copolymer films of Comparative Preparation Examples 1 to 14, respectively, instead of the amide-imide copolymer film of Preparation Example 1.

Evaluation 2

A light transmittance, a yellow index, and a pencil hardness of the stacked transparent films according to Examples 1 to 14 and Comparative Examples 1 to 14 are measured and evaluated.

The light transmittance is measured as Y(D65) in a region of 380 nm to 780 nm by using a UV spectrophotometer (cm-3600d, Konika Minolta Inc.).

The yellow index (YI) is measured according to ASTM D1925 by using a UV spectrophotometer (cm-3600d, Konika Minolta Inc.).

The pencil hardness is evaluated by measuring five times per sample according to ASTM D3363, with a vertical load of 1 kg at a speed of 60 mm/min by using a pencil hardness-measuring device and a Mitsubishi pencil according to ASTM D3363, and then the greatest hardness is determined when the film is not scratched.

The results are shown in Tables 3 and 4.

TABLE 3

|  | Light transmittance (%) | Yellow index (YI, D1925) | Pencil hardness |
| --- | --- | --- | --- |
| Example 1 | 90.4 | 0.7 | 6H |
| Example 2 | 89.6 | −0.4 | 5H |
| Example 3 | 89.8 | −0.1 | 5H |
| Example 4 | 89.8 | 1.0 | 6H |
| Example 5 | 90.3 | 0.8 | 5H |
| Example 6 | 90.0 | 0.7 | 6H |
| Example 7 | 90.3 | 0.2 | 5H |
| Example 8 | 90.1 | −0.5 | 5H |
| Example 9 | 90.0 | −0.3 | 5H |
| Example 10 | 89.9 | 0.7 | 5H |
| Example 11 | 90.1 | 0.3 | 6H |
| Example 12 | 89.7 | 0.6 | 5H |
| Example 13 | 90.5 | 1.5 | 6H |
| Example 14 | 90.3 | 1.5 | 6H |

TABLE 4

|  | Light transmittance (%) | Yellow index (YI, D1925) | Pencil hardness |
|---|---|---|---|
| Comparative Example 1 | 88.0 | 3.1 | 5H |
| Comparative Example 2 | 89.7 | 0.3 | 3H |
| Comparative Example 3 | 89.9 | −0.6 | 3H |
| Comparative Example 4 | 90.5 | −1.5 | 2H |
| Comparative Example 5 | 90.3 | −0.1 | 3H |
| Comparative Example 6 | 90.4 | −1.4 | 2H |
| Comparative Example 7 | 91 | −1.2 | 2H |
| Comparative Example 8 | 90.8 | −0.7 | 2H |
| Comparative Example 9 | 90.8 | −0.5 | 2H |
| Comparative Example 10 | 83.6 | 16.2 | 5H |
| Comparative Example 11 | 90.4 | −1.2 | 2H |
| Comparative Example 12 | 90.2 | −0.6 | 3H |
| Comparative Example 13 | 90.2 | 0.2 | 3H |
| Comparative Example 14 | 89.9 | −0.4 | 3H |

Referring to Table 3, the stacked transparent films according to Examples 1 to 14 all show improved light transmittance, yellow index, and pencil hardness compared with the polymer films according to Preparation Examples 1 to 13 shown in Table 1. Accordingly, the stacked transparent films according to Examples 1 to 14 all show improved optical properties and mechanical characteristics compared with a case of using a polymer film alone.

Specifically, the stacked transparent films according to Examples 1 to 14 satisfy a light transmittance of greater than or equal to 85%, a pencil hardness of greater than or equal to 4H, and an absolute value of a yellow index of less than or equal to 2.0, and more specifically, the stacked transparent films of Examples 1 to 14 satisfy a light transmittance of greater than or equal to about 89.5%, a pencil hardness of greater than or equal to 5H, and an absolute value of a yellow index of less than or equal to about 1.5.

In addition, referring to Tables 3 and 4, the stacked transparent films of Examples 1 to 14 using a polymer film having a refractive index of 1.65 to 1.75 and an elastic modulus of greater than or equal to 5.5 GPa, and simultaneously satisfy the optical properties and mechanical characteristics, but the stacked transparent films of Comparative Examples 1 to 14 do not satisfy at least one of having a refractive index of 1.65 to 1.75 and having an elastic modulus of greater than or equal to 5.5 GPa, and thus satisfy neither the optical properties nor the mechanical characteristics. Specifically, the stacked transparent films of Examples 1 to 14 simultaneously satisfy a light transmittance of greater than or equal to 85%, a pencil hardness of greater than or equal to 4H, and a yellow index of an absolute value of less than or equal to 2.0, but the stacked transparent films of Comparative Examples 1 to 14 show a high yellow index or a low pencil hardness.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A stacked transparent film comprising
   a polyamide-polyimide polymer film comprising an amide structural unit and an imide structural unit, wherein the polymer film has a refractive index of about 1.65 to about 1.75 at a 550 nanometer wavelength and an elastic modulus of greater than or equal to about 5.5 gigapascals; and
   at least one of a first coating layer on a first side of the polymer film and a second coating layer on a side opposite the first side of the polymer film,
   wherein the polyamide-imide polymer film is obtained by preparing an amide group-containing oligomer by reacting a dicarboxylic acid compound and a diamine compound; and
   reacting an anhydride and the amide group-containing oligomer.

2. The stacked transparent film of claim 1, wherein a light transmittance of the stacked transparent film in a visible ray region is greater than a light transmittance of the polymer film in a visible ray region.

3. The stacked transparent film of claim 1, wherein a pencil hardness of the stacked transparent film is greater than a pencil hardness of the polymer film, each as measured according to ASTM D3363.

4. The stacked transparent film of claim 3, wherein the pencil hardness of the polymer film is greater than or equal to 2H and the pencil hardness of the stacked transparent film is greater than or equal to 4H, each as measured according to ASTM D3363.

5. The stacked transparent film of claim 1, wherein an absolute value of a yellow index of the stacked transparent film is less than an absolute value of a yellow index of the polymer film, each as measured according to ASTM D1925.

6. The stacked transparent film of claim 5, wherein the absolute value of the yellow index of the polymer film is about 2.2 to about 3.6 at a thickness of 50 micrometers, as measured according to ASTM D19251, and the absolute value of the yellow index of the stacked transparent film is less than or equal to about 2.0, as measured according to ASTM D1925.

7. The stacked transparent film of claim 1, wherein the first coating layer has a refractive index of about 1.45 to about 1.55 at a 550 nanometer wavelength.

8. The stacked transparent film of claim 1, wherein the first coating layer comprises a polysiloxane copolymer having a cross-linked structure.

9. The stacked transparent film of claim 8, wherein the first coating layer further comprises inorganic particles dispersed in the polysiloxane copolymer or chemically bound to the polysiloxane copolymer.

10. The stacked transparent film of claim 8, wherein the first coating layer further comprises a light absorbing material that absorbs light in at least a portion of an about 570 nanometer to about 780 nanometer wavelength region.

11. The stacked transparent film of claim 1, wherein the second coating layer comprises a light absorbing material that absorbs light in at least a portion of an about 570 nanometer to about 780 nanometer wavelength region.

12. The stacked transparent film of claim 1, wherein the second coating layer has a refractive index of about 1.50 to about 1.65.

13. The stacked transparent film of claim 1, wherein the stacked transparent film comprises the second coating layer, and further comprises a transparent adhesive layer on a side of the second coating layer opposite the polymer film.

14. The stacked transparent film of claim 13, wherein the transparent adhesive layer has a refractive index of about 1.45 to about 1.55.

15. The stacked transparent film of claim 1, wherein the stacked transparent film has a light transmittance of greater than or equal to about 85%, a pencil hardness of greater than or equal to 4H, as measured according to ASTM D3363, and an absolute value of a yellow index of less than or equal to about 2.0, as measured according to ASTM D1925, simultaneously.

16. The stacked transparent film of claim 1, wherein the polymer film has a thickness of about 20 micrometers to about 100 micrometers.

17. A window for a display device, the window comprising the stacked transparent film of claim 1.

18. A display device comprising the stacked transparent film of claim 1.

19. An amide-imide copolymer film having a thickness of about 20 micrometers to about 100 micrometers, a refractive index of about 1.65 to about 1.75 at a 550 nanometer wavelength, and an elastic modulus of greater than or equal to about 5.5 gigapascals,
wherein the amide-imide copolymer film is obtained by
preparing an amide group-containing oligomer by reacting a dicarboxylic acid compound and a diamine compound; and
reacting an anhydride and the amide group-containing oligomer.

20. The amide-imide copolymer film of claim 19, wherein a pencil hardness of the amide-imide copolymer film is greater than or equal to 2H, as measured according to ASTM D3363.

21. The amide-imide copolymer film of claim 19, wherein an absolute value of a yellow index of the amide-imide copolymer film is about 2.2 to about 3.6 at the thickness of 50 micrometers, as measured according to ASTM D1925.

22. A window for a display device, the window comprising the amide-imide copolymer film of claim 19.

23. A display device comprising the amide-imide copolymer film of claim 19.

* * * * *

UNITED STATES PATENT AND TRADEMARK OFFICE
CERTIFICATE OF CORRECTION

| | | |
|---|---|---|
| PATENT NO. | : 10,809,421 B2 | Page 1 of 1 |
| APPLICATION NO. | : 15/714436 | |
| DATED | : October 20, 2020 | |
| INVENTOR(S) | : Sun Jin Song et al. | |

It is certified that error appears in the above-identified patent and that said Letters Patent is hereby corrected as shown below:

On the Title Page

Item (73) The Assignees information should be corrected to read:
SAMSUNG ELECTRONICS CO., LTD.
129, SAMSUNG-RO, YEONGTONG-GU, GYEONGGI-DO
SUWON-SI, KOREA, REPUBLIC OF 16677
and
SAMSUNG SDI CO., LTD.
150-20 GONGSE-RO, GIHEUNG-GU, GYEONGGI-DO
YONGIN-SI, KOREA, REPUBLIC OF 17084.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*